(12) United States Patent
Kozu et al.

(10) Patent No.: US 6,451,474 B1
(45) Date of Patent: Sep. 17, 2002

(54) RESILIENTLY DEFORMABLE BATTERY PACK

(75) Inventors: Katsumi Kozu, Sanda; Shigeru Kajiwara, Hirakata; Shoji Konishi, Kyoto; Takashi Takemura, Shijonawate; Junji Fujiwara, Izumiotsu; Ryoichi Kaiwa; Tetsuo Hirabayashi, both of Yokohama, all of (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/530,556

(22) PCT Filed: Sep. 13, 1999

(86) PCT No.: PCT/JP99/04994

§ 371 (c)(1),
(2), (4) Date: Jun. 21, 2000

(87) PCT Pub. No.: WO00/16416

PCT Pub. Date: Mar. 23, 2000

(30) Foreign Application Priority Data

| Sep. 11, 1998 | (JP) | 10-258374 |
| Sep. 11, 1998 | (JP) | 10-258375 |
| May 31, 1999 | (JP) | 11-151188 |
| May 31, 1999 | (JP) | 11-151189 |
| Aug. 18, 1999 | (JP) | 11-231658 |

(51) Int. Cl.[7] .................... H01M 2/10; H01M 2/00
(52) U.S. Cl. .................... 429/100; 429/96; 429/97; 429/99; 429/127; 429/136; 429/124; 429/148; 429/153; 429/159; 429/162; 429/163; 429/167; 429/176; 429/177
(58) Field of Search .................... 429/96–100, 136, 429/127, 124, 148, 153, 159, 162, 163, 167, 176, 177

(56) References Cited

U.S. PATENT DOCUMENTS

| 5,298,347 A | * | 3/1994 | Aksoy et al. ............ 429/98 |
| 5,587,250 A | | 12/1996 | Thomas et al. |

FOREIGN PATENT DOCUMENTS

| JP | 6-275248 | | 9/1994 | |
| JP | 6-302306 | | 10/1994 | |
| JP | 7-50157 | | 2/1995 | |
| JP | 07050157 A | * | 2/1995 | .......... H01M/2/10 |
| JP | 7-130342 | | 5/1995 | |
| JP | 8-504053 | | 4/1996 | |
| JP | 10208720 A | * | 3/1998 | .......... H01M/2/12 |
| JP | 10-208711 | | 8/1998 | |
| JP | 10-208720 | | 8/1998 | |
| JP | 11-111250 | | 4/1999 | |
| WO | WO95/08848 | | 3/1995 | |

* cited by examiner

*Primary Examiner*—Carol Chaney
*Assistant Examiner*—Angela J. Martin
(74) *Attorney, Agent, or Firm*—Jordan and Hamburg LLP

(57) ABSTRACT

A battery pack that reduces thickness and lightens weight as required for battery power sources of portable electronic equipment. A battery pack is constituted by accommodating a battery and battery protection device between a top case and bottom case forming a pack case. Since the battery is formed accommodated within an external casing wherein positive and negative electrode plates are formed by laminated sheet, reduced thickness and reduced weight of battery pack can be achieved. Also, since the face of bottom case opposite the battery is formed as a resiliently deformable face which is formed of small thickness, when expansion takes place such that the thickness of the battery as a whole increases, resiliently deformable face deforms maintaining a planar condition by resilient deformation, so that there is no possibility of an adverse effect on the equipment due to drum-shaped swelling being produced in battery pack, by such swelling.

17 Claims, 27 Drawing Sheets

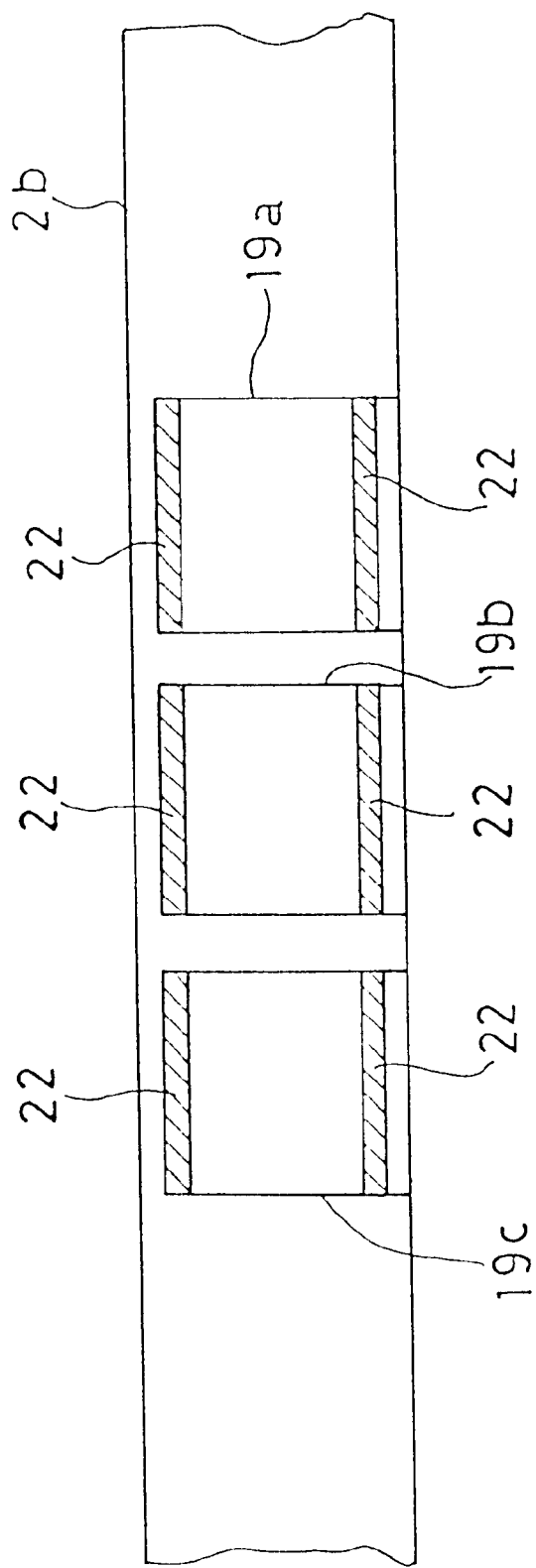

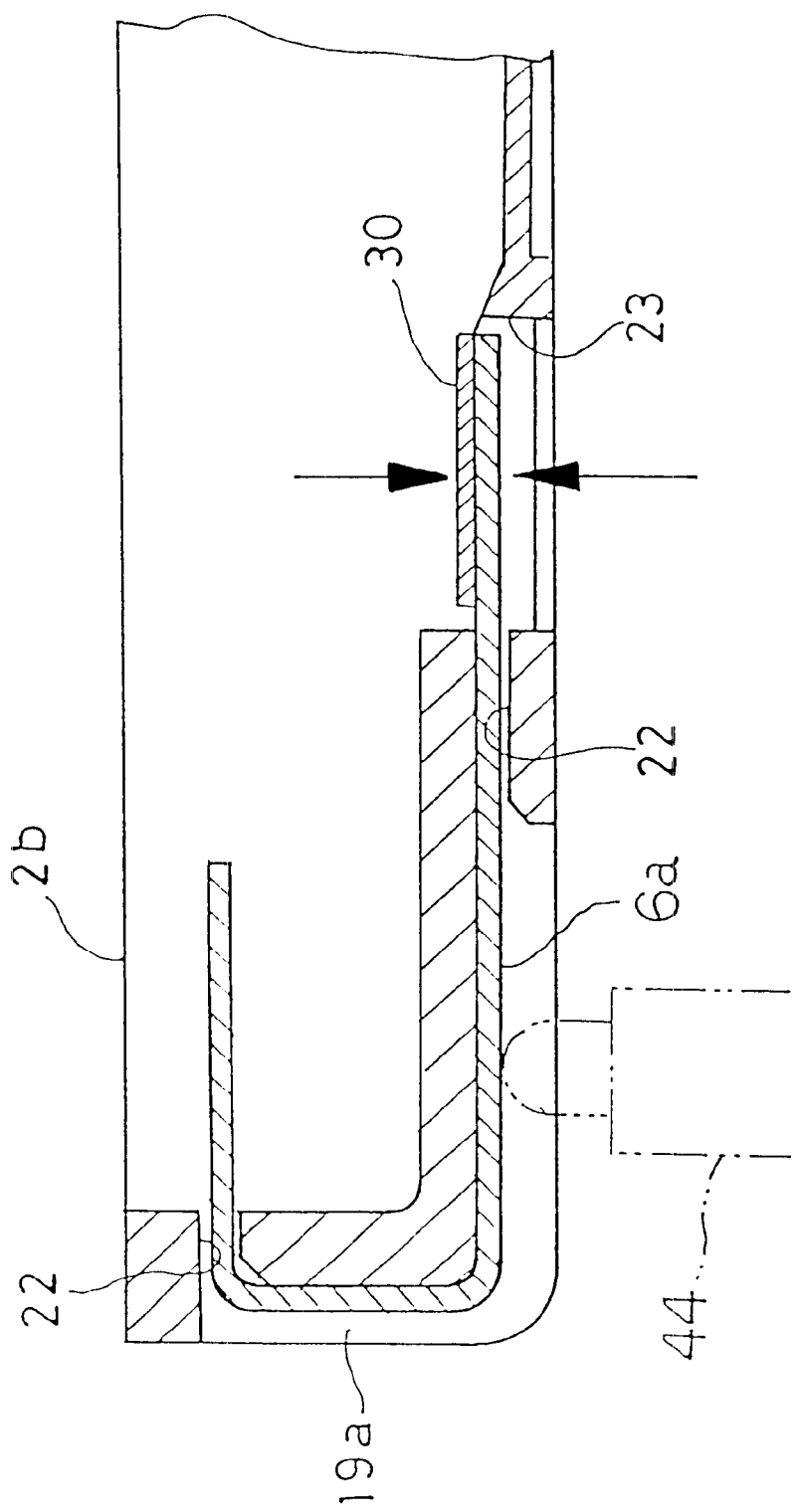

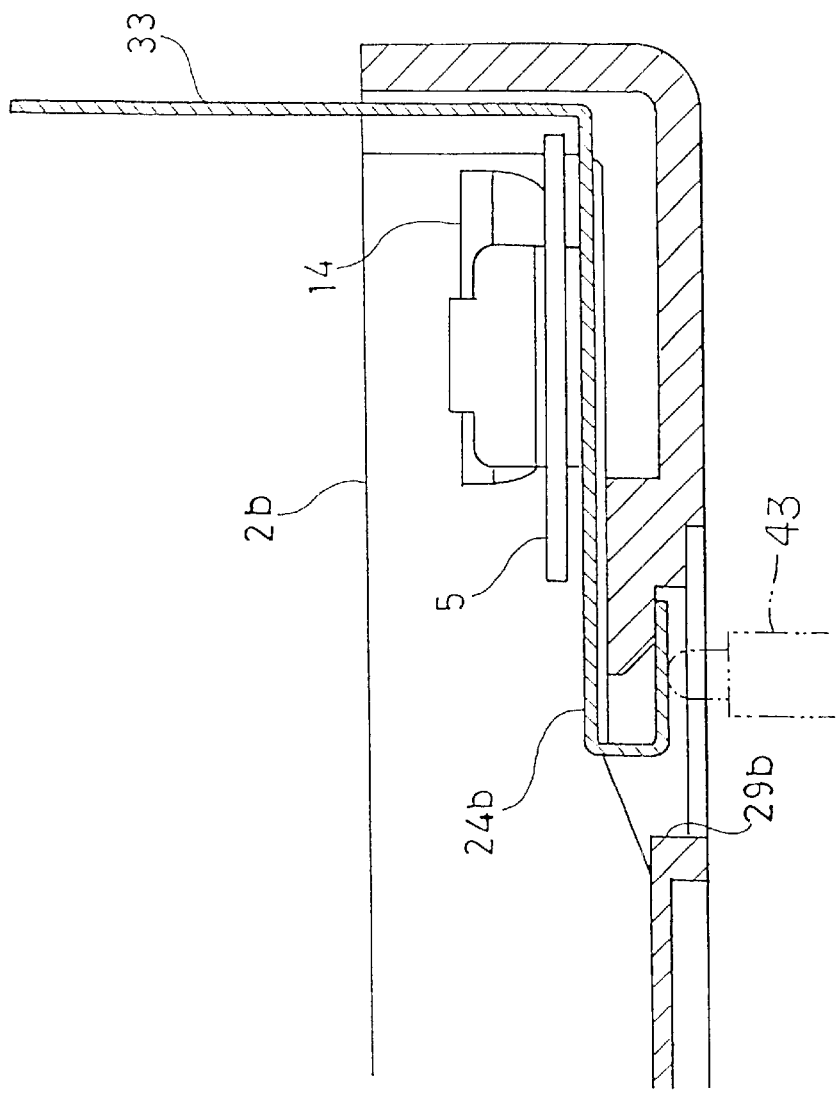

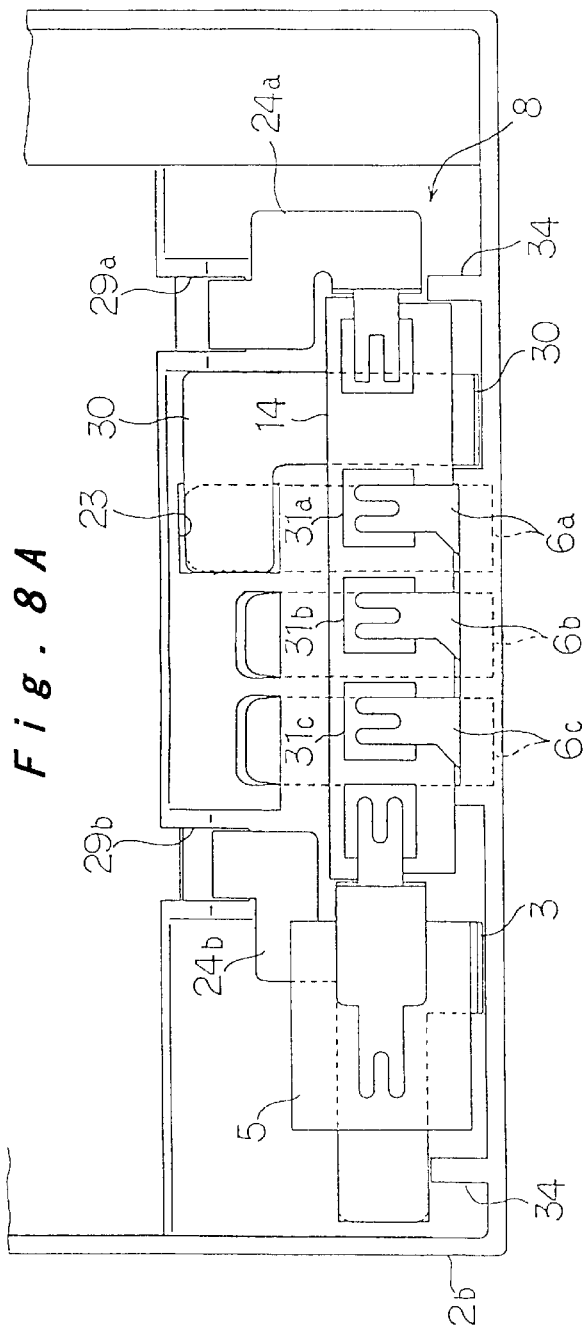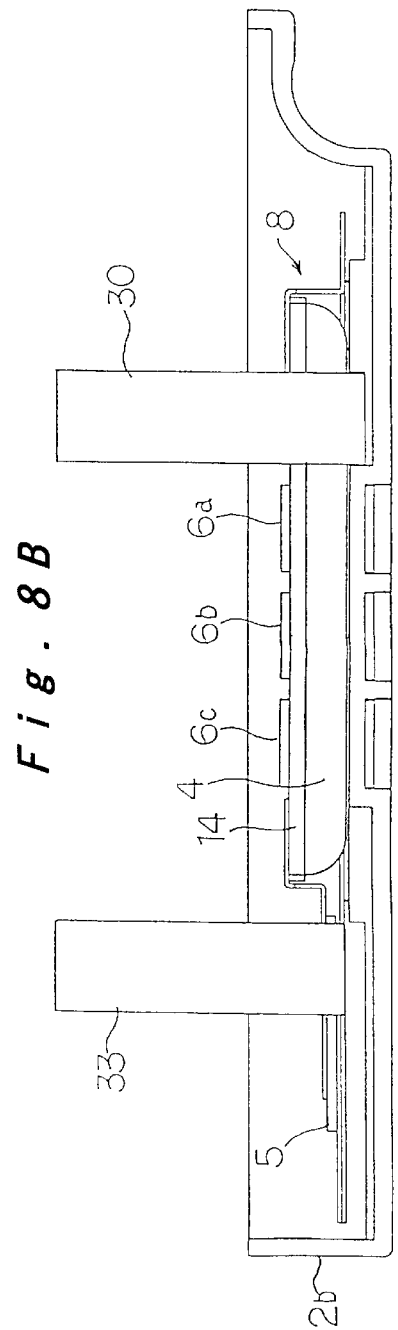

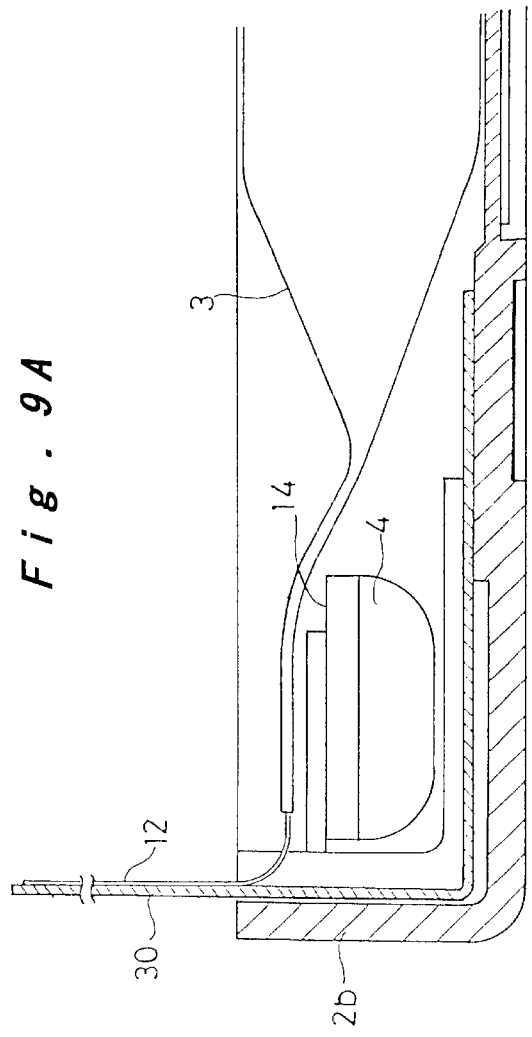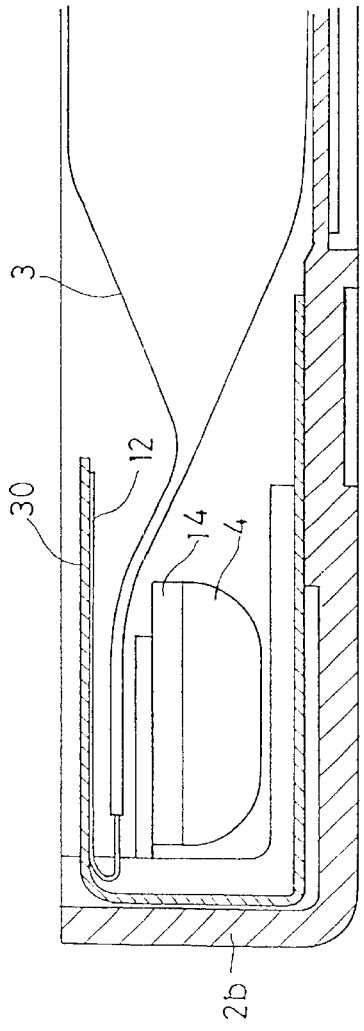

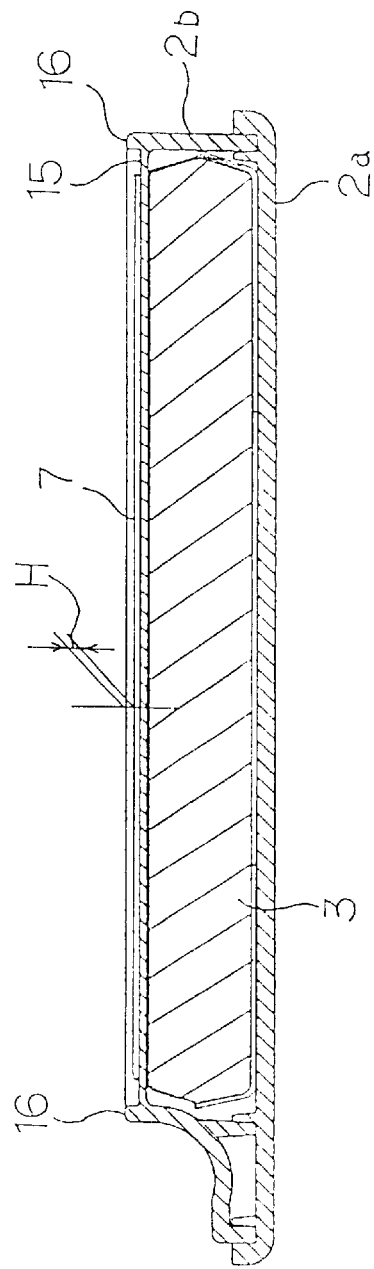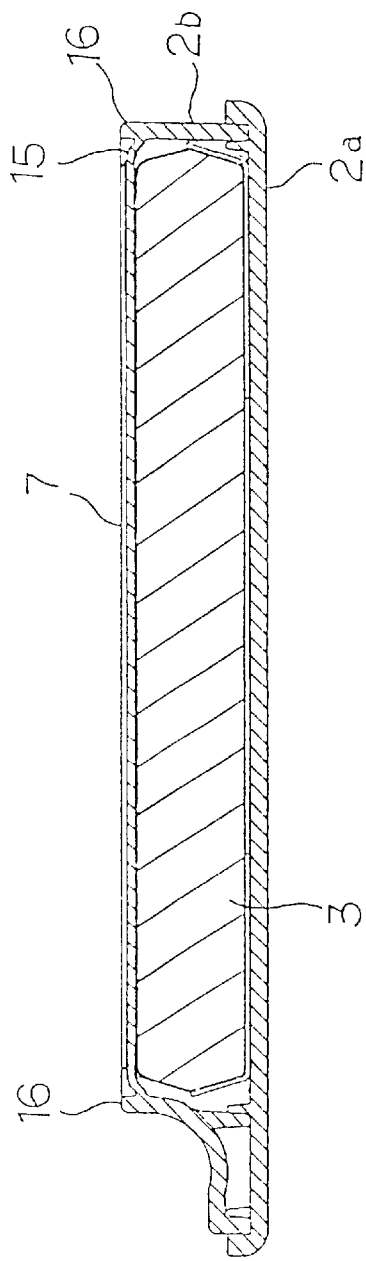

Fig. 25A
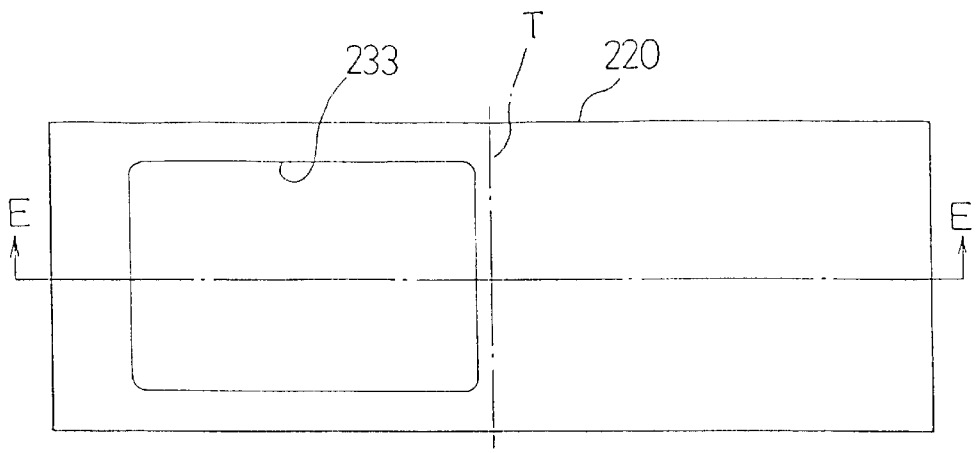
Fig. 25B
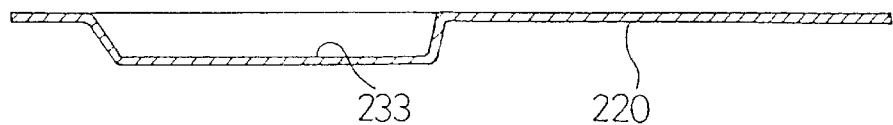
Fig. 26A        Fig. 26B
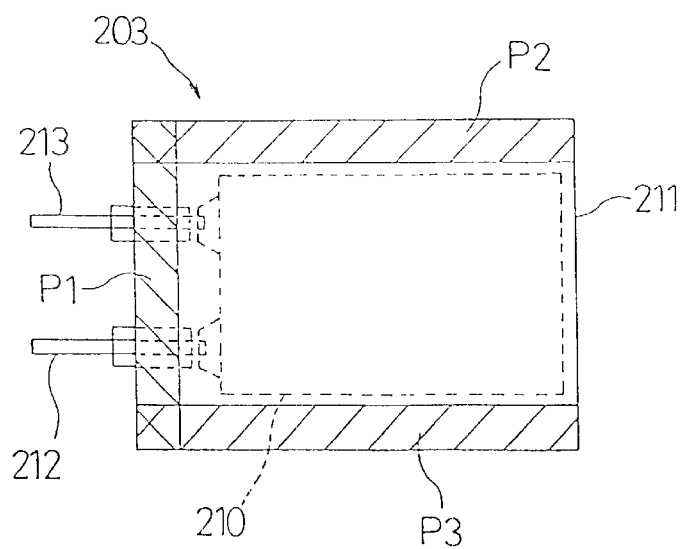

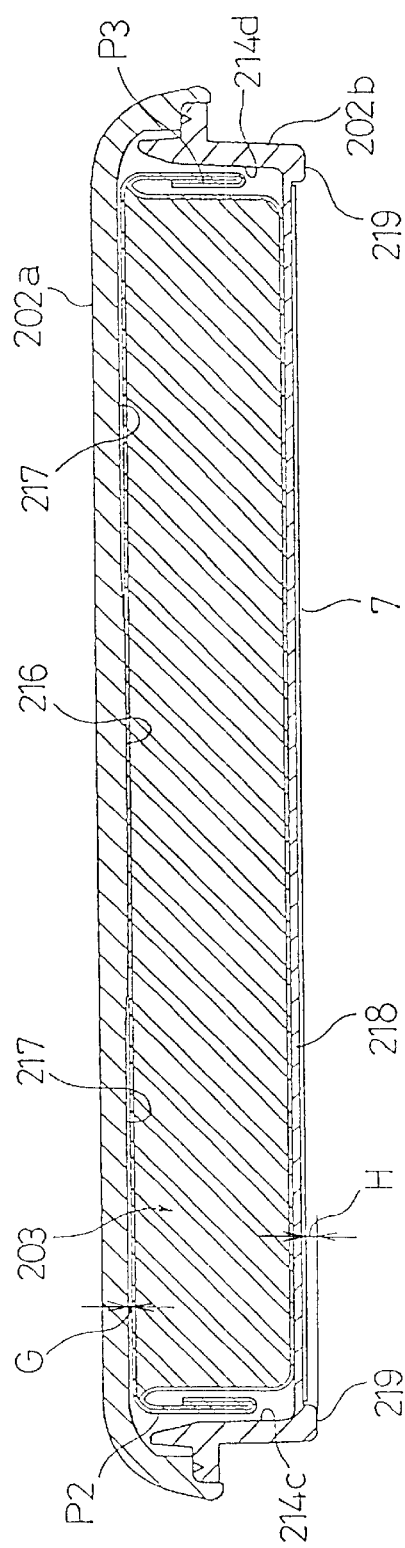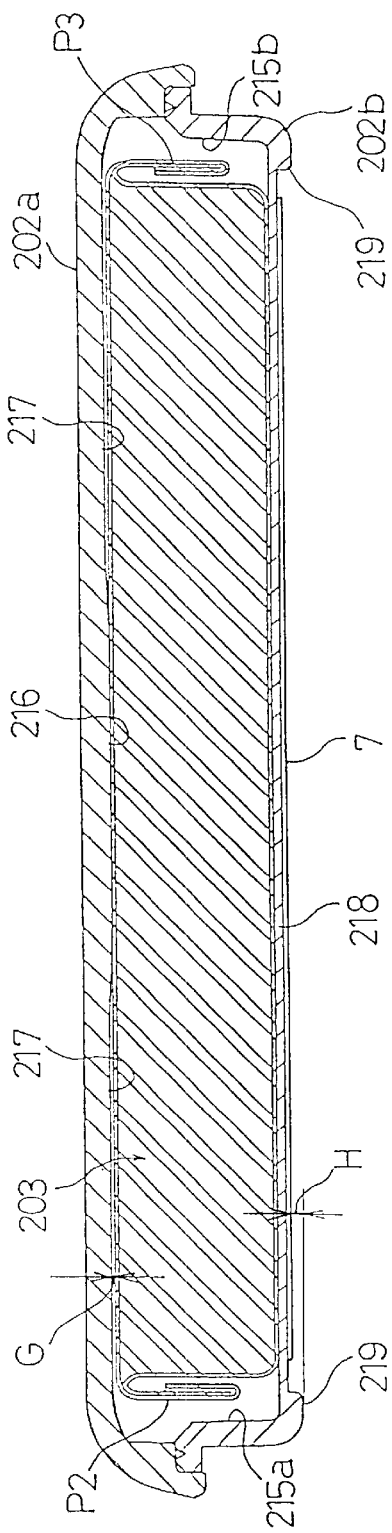

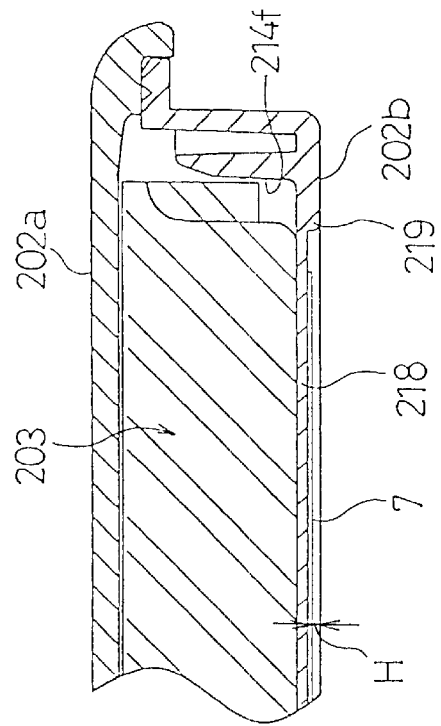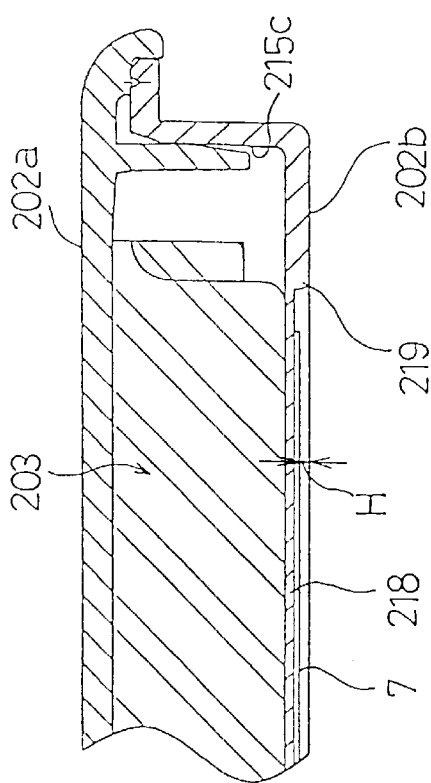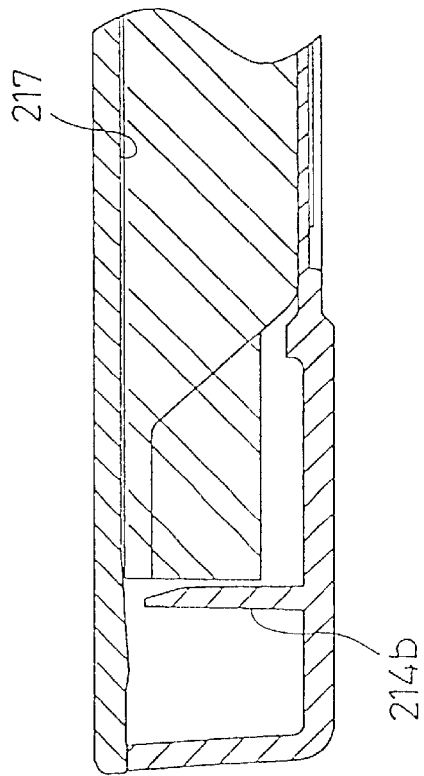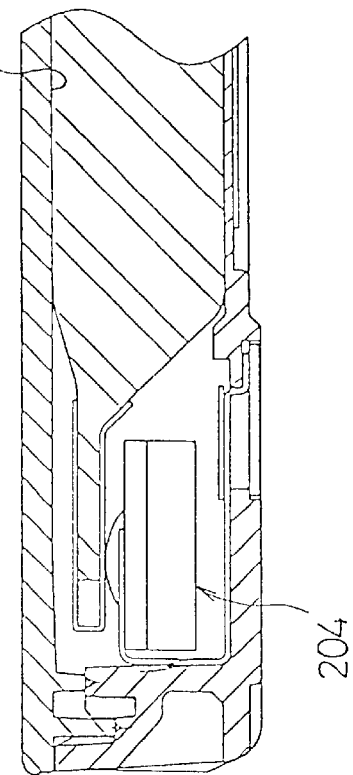
Fig. 29A
Fig. 29B

RESILIENTLY DEFORMABLE BATTERY PACK

BACKGROUND OF THE INVENTION

The present invention relates to a battery pack constituted using secondary batteries which are formed accommodating electricity generating elements within a soft external case, in order to achieve reduction in size, weight and thickness that is required for battery power sources of portable information equipment such as mobile telephones or mobile computers.

The ratio represented by the batteries in the volume and weight of portable information equipment such as mobile telephones or mobile computers is considerable, and it is no exaggeration to say that batteries hold the key to reduction in size, weight and thickness of portable information equipment.

Flat-shaped lithium ion secondary batteries are employed in order to respond to such demands for reduction in size, weight and thickness of portable information equipment; however, it is anticipated that lithium polymer secondary batteries may provide secondary batteries capable of further reductions in weight and thickness. In particular those formed by accommodating electricity-generating elements in the form of a laminated sheet within an external casing are effective in realizing reductions in weight and thickness.

In secondary batteries of high energy density such as lithium-based secondary batteries, in order to prevent deterioration or damage to the battery by overcharging, over-discharging, or excessive discharge current etc., the use of a battery protective device constituted using a protection circuit or PTC etc. is indispensable. Such is accommodated in a battery pack case together with the secondary battery to constitute a battery pack.

However, swelling of the external casing occurs when the secondary battery undergoes expansion of the electrode plates due to repeated charging/discharging and/or changes over time, or when gas is generated by decomposition of the electrolyte due to causes such as being left at high temperature in a fully charged condition. When such a condition is generated in the secondary battery accommodated in the pack case, the swelling of the secondary battery is communicated to the pack case, producing changes in the external dimensions of the pack case. In the case of miniature portable equipment such as mobile telephones, the battery pack faces the constituent elements of the equipment with only a slight intervening gap, wherefore changes in the external dimensions of the pack case affect the equipment. In particular, in the case of a secondary battery wherein the external casing is formed by soft material such as laminated sheet, expansion of the electrode plates or generation of gas immediately produces swelling of the external casing, and this produces swelling of the pack case, changing its external dimensions.

Also, in the case of secondary batteries of a construction in which a group of laminated electrode plates constituted by laminating a plurality of positive and negative electrode plates is accommodated in a soft external casing made of for example laminated sheets, the restraining force whereby the external casing holds the positive and negative electrode plates in their prescribed positions is weak, so positional displacement of the electrode plates can easily occur when subjected to shock or vibration, giving rise to the problem of damage such as internal short-circuits or disconnections being easily produced. Also, even in the case of a secondary battery of a construction in which electrode plates in which positive and negative electrode plates are coiled are accommodated in a soft external casing, damage occurs due to disconnections etc. produced by movement of the electrode plates. Also, since the laminated sheets are formed by disposing a resin layer on both sides of a metallic layer, if a secondary battery is displaced within the pack case by vibration or shock, the resin layer is destroyed by contact with metallic members arranged within the pack case, giving rise to short-circuiting between the metallic members and metallic layer.

An object of the present invention is to provide a battery pack in which reduction in size, weight and thickness are achieved by solving the problems in a battery pack employing a secondary battery in which a soft material is used for the external casing.

SUMMARY OF THE INVENTION

According to a first aspect of the present invention, a battery pack wherein a secondary battery formed in flat plate shape by accommodating electricity generating elements within an external casing formed of soft material is accommodated in a pack case is characterized in that a face on one side of said pack case, facing a flat plate face of said secondary battery, is formed as a resiliently deformable face that deforms resiliently corresponding to changes in thickness of the secondary battery, while the face on the other side is formed as a rigid face consisting of a rigid element.

With such a construction, although it might be feared that if the secondary battery constituted by accommodating electricity generating elements within a soft external casing such as a laminated sheet suffered expansion of the electrode plates constituting the electricity-generating element, such expansion would immediately be communicated to the external casing, producing swelling of the pack case with adverse effect on the equipment thanks to the formation of one face of the pack case opposite the battery by a resiliently deformable face, the increase in thickness of the resiliently deformable face of the battery pack takes place uniformly without swelling in specific locations, so abnormal deformation is not produced in the external shape of the battery pack, and there is thus no possibility of adverse effect on the equipment due to swelling of the battery pack. Even in the case where the aforesaid secondary battery is constituted by electricity generating elements using electrode plates of a coiled construction in which the positive and negative electrode plates are coiled, when this is formed into flat plate shape, a condition is produced in which the electrode plates are laminated in the thickness direction, so that this is the same as the case of the laminated construction in which a plurality of positive and negative electrode plates are laminated; thus swelling of the electrode plates results in a uniform increase in the thickness of the secondary battery. Thus, whether the electrode plates are of laminated construction or of coiled construction, the benefit of the resiliently deformable face is obtained.

According to a second aspect of the present invention, a battery pack wherein a secondary battery formed in flat plate shape by accommodating electricity generating elements within an external casing formed of soft material is accommodated in a pack case is characterized in that both faces of said pack case opposite flat plate faces of said secondary battery are formed as resiliently deformable faces that deform resiliently corresponding to changes of thickness of the secondary battery, and their peripheral portion is supported by a rigid element surrounding the side faces of the secondary battery.

With the above construction, in the event of swelling of the electrode plates constituting the electricity-generating element, since the thickness of the battery pack as a whole increases in uniform fashion due to the resilient deformation of the resiliently deformable faces formed on both faces of the pack case, abnormal deformation of the external shape of the battery pack cannot occur. Even when the aforesaid secondary battery is constituted by electricity generating elements employing electrode plates of coiled structure in which positive and negative electrode plates are coiled, when this is formed in flat plate shape, a condition in which the electrode plates are laminated in the thickness direction is produced, so that, just as in the case of the laminated construction in which a plurality of positive and negative electrode plates are laminated, swelling of the electrode plates results in uniform increase in thickness of the secondary battery. Consequently, whether the electrodes are of laminated construction or coiled construction, the benefit of the aforesaid resiliently deformable face is obtained.

According to a third aspect of the present invention, a battery pack wherein a secondary battery formed in flat plate shape by accommodating electricity generating elements within an external casing formed of soft material is accommodated in a pack case is characterized in that the internal dimension in the thickness direction of said pack case is formed smaller than the thickness of the secondary battery, and both faces or one face opposite a planar face of said secondary battery are formed as resiliently deformable faces that deform resiliently corresponding to changes of thickness of the secondary battery.

With this construction, since the battery is accommodated in a pack case that is formed with internal dimension in the thickness direction that is smaller than the thickness of the battery, the resiliently deformable face is resiliently deformed, and a condition is produced in which pressure is constantly applied in the compression direction to the battery accommodated therein, by this stress. Expansion of the battery that is constantly subjected to this pressure in the compression direction is suppressed, enabling the thickness change of the battery pack to be reduced. Even when the aforesaid secondary battery is constituted by electricity generating elements employing electrode plates of coiled structure in which positive and negative electrode plates are coiled, when this is formed in flat plate shape, a condition in which the electrode plates are laminated in the thickness direction is produced, so that, just as in the case of the laminated construction in which a plurality of positive and negative electrode plates are laminated, swelling of the electrode plates results in uniform increase in thickness of the secondary battery. Consequently, whether the electrodes are of laminated construction or coiled construction, the benefit of the aforesaid resiliently deformable face is obtained.

According to a fourth aspect of the present invention, a battery pack wherein a secondary battery formed in flat plate shape by accommodating electricity generating elements within an external casing formed of soft material is accommodated in a pack case is characterized in that one face or both faces of this pack case opposite a flat plate face of said secondary battery is formed by a resiliently deformable face that deforms resiliently corresponding to changes of thickness of the secondary battery, a peripheral part being formed that projects to a prescribed height from resiliently deformable face at the periphery or on both sides of this resiliently deformable face.

With this construction, even if the resiliently deformable face swells up on the inside of the peripheral part, this does not result in change in the external dimensions of the battery pack, and so there is no effect on the equipment in which the battery pack is loaded due to changes in external shape. Consequently, the projecting height of the peripheral part is set so as not to be less than the maximum amount of swelling of the resiliently deformable face produced by swelling of the battery. Even when the aforesaid secondary battery is constituted by electricity generating elements employing electrode plates of coiled structure in which positive and negative electrode plates are coiled, when this is formed in flat plate shape, a condition in which the electrode plates are laminated in the thickness direction is produced, so that, just as in the case of the laminated construction in which a plurality of positive and negative electrode plates are laminated, swelling of the electrode plates results in uniform increase in thickness of the secondary battery. Consequently, whether the electrodes are of laminated construction or coiled construction, the benefit of the aforesaid resiliently deformable face is obtained.

According to a fifth aspect of the present invention, a battery pack wherein a secondary battery and a battery protection device constituted by providing a circuit board formed with at least a protective circuit to protect the secondary battery are accommodated within a pack case formed in flat shape, a positive electrode lead and negative electrode lead leading from said secondary battery being connected to external input/output terminals that are provided on the pack case on the other side of said battery protecting device is characterized in that electricity generating elements of said secondary battery is accommodated within an external casing which is sealed by welding the peripheral parts of a pair of laminated sheets, a positive electrode lead and negative electrode lead being led from the weld-sealed side, said battery protection device being arranged on the side of this secondary battery where said positive electrode lead and negative electrode lead are led out.

With this construction, since the positive electrode lead and negative electrode lead of the secondary battery are led out from one weld-sealed side of a laminated sheet constituting an external casing, a battery protection device being arranged on this side where the leads are led out, a simple construction is achieved with the minimum distance of the connection between the secondary battery and battery protection device, and the number of constituent members and processing steps can be reduced and the thickness of the battery pack can easily be decreased.

With this construction, since the circuit board has its planar direction parallel with the flat plate face direction of the secondary battery, and at least part of the weld-sealed portion of the external casing is arranged in an overlapped position, small size and thickness of the battery pack can be achieved by accommodating the battery protection device in a pack case of small thickness and providing an accommodating space in respect of the welded seal.

By means of a construction in which the battery protection device is arranged offset to one side in the thickness direction within pack case, the positive electrode lead being connected with a positive electrode connection member connected to a circuit board and a negative electrode connection member and negative electrode lead being connected at a position offset in the other direction of the thickness direction within the pack case, a weld-sealed portion of the battery being arranged between this lead connection position and battery protection device, insulation between the lead connection portion and the battery protection device can be ensured by interposing the weld-sealed portion therebetween, even though the lead connection position is arranged on the battery protection device.

By arranging an insulating member between at least the weld-sealed portion of external casing and battery protection device, incidents of the weld-sealed portion of the external casing which is arranged overlapping the battery protection device coming into contact with the circuit board etc. and coming into contact with a conductive location in a metallic layer by destruction of the resin of the laminated sheet when subjected to vibration or impact can be prevented.

By a construction in which the battery protection device is provided with a PTC element, this PTC element being formed in plate shape, the direction of its planar face being parallel with the flat plate direction of the secondary battery and at least part of the weld-sealed portion of external casing being arranged in an overlapped position, generation of wasted space within the thin pack case can be avoided, making it possible to reduce the size and thickness of the battery pack.

According to a sixth aspect of the present invention, a battery pack wherein a secondary battery formed in flat plate shape by accommodating electricity generating elements formed by a laminated sheet is accommodated in a pack case is characterized in that said pack case comprises a planar portion facing both flat plate faces of said secondary battery and a plurality of wall face parts facing the side faces of this secondary battery, said planar part and wall face parts being constituted so as to restrict the position of accommodation of the secondary battery in the pack case.

With this construction, since the planar faces of the secondary battery face planar parts of the pack case on both sides, and each side face is accommodated within the pack case by positional location in a condition surrounded by wall faces of the pack case, there is no possibility of the secondary battery being displaced within the pack case when subjected to impact etc., so damage to the battery due to impact can be prevented even for the case of a secondary battery in which the electricity-generating element is accommodated in an external casing formed by a laminated sheet.

According to a seventh aspect of the present invention, a battery pack wherein a secondary battery is accommodated in a pack case divided into a top case and bottom case in the thickness direction of the secondary battery formed in flat plate shape, a battery accommodating space of internal dimension corresponding to the thickness of the secondary battery being formed when the two cases are mated by bringing into abutment bonding parts respectively formed on both cases, the battery pack being thereby integrated by bonding the two cases by said bonding parts, is characterized in that fitting-in parts are formed that effect mutual fitting-in between both cases such as to maintain a positionally located condition by abutment between said bonding parts when the two cases are mated with said pack case accommodating the secondary battery, a secondary battery formed in flat plate shape being accommodated in this pack case by accommodating an electricity generating element within a soft external casing.

In the above construction, the secondary battery accommodating electricity generating elements within a soft external casing, compared with a battery in which the electricity-generating element is accommodated within a rigid external casing such as a metallic casing, does not have a fixed and uniform thickness, on account of the softness of the external casing, and exhibits resilience in respect of outside pressure due to the pouring in of electrolyte into the casing. When this is accommodated in a pack case formed with a battery accommodating space of internal dimension corresponding to the thickness of the secondary battery, when the top case and bottom case are mated, due to the thickness of the secondary battery, it may happen that, even when these are pressed together, the bonding portions of the two cases cannot be brought together and positional location cannot be achieved. With the construction described above, by forming the faces of the top case and/or bottom case opposite the planar faces of the battery as resiliently deformable faces, and forming fitting-in parts between the two cases, when the top case and bottom case are pressed together so as to bring the bonding parts of the two cases into contact, any thickness error of the secondary battery is absorbed by deformation of the aforesaid resiliently deformable faces, and any possibility of the two cases springing back from a positionally located condition due to resilient recoil of the secondary battery is obviated by the fitting together of the two cases by these fitting-in parts. Consequently, even if the two cases are unified by bonding by bonding means such as ultrasonic welding, since a contacting condition is maintained between the bonding parts, bonding of a pack case accommodating a secondary battery whose thickness is not fixed and uniform can be achieved in a stable fashion.

In the above construction, by adopting a construction wherein wall faces are formed surrounding the side faces of the secondary battery at the periphery of the battery accommodating space, bonding parts being formed near to the outside of these wall faces, the strength of the wall faces where the outer case is bonded to the bonding surface is increased, and deformation of the wall faces due to impact is prevented, so damage to the secondary battery due to deformation of the wall faces is prevented.

According to an eighth aspect of the present invention, a battery pack wherein a secondary battery formed in a rectangular flat plate shape by sealing electricity generating elements within an external casing formed by laminated sheet is accommodated within a pack case is characterized in that, within said pack case, there are formed in said pack case a position restricting location that restricts the accommodation position of said secondary battery and a space-forming location that provides a space between itself and the secondary battery.

With the construction described above, by restricting the accommodation position of the secondary battery within the pack case, the position-restricting location formed within the pack case fixes the secondary battery in position within the pack case, thereby preventing movement of the secondary battery when this is subjected to impact or shock. Also, the position-restricting location that abuts the planar surface prevents expansion of the electrode plates by applying tensioning pressure in the direction of lamination of the electrode plates. Also, since the space-forming location forms a space between itself and the secondary battery, when swelling is generated in the external casing due to generation of gas, the swelling of the soft external casing formed by the laminated sheet is accommodated in the space provided by the space-forming location, so that the swelling of the external casing cannot cause changes in the external dimensions of the pack case.

In the above construction, by suitably forming position-restricting locations and space-forming locations in respect of the secondary battery on the inside face of the pack case facing the planar faces of the secondary battery, expansion of the electrode plates is suppressed by the position-restricting locations restricting the position of accommodation of the secondary battery in the pack case and applying tensioning pressure thereto, and swelling of the external casing can be absorbed by the space-forming locations.

In a secondary battery of the above construction, a group of laminated electrode plates obtained by laminating a plurality of positive and negative electrode plates is accommodated within a soft external casing. With a secondary battery of this laminated type, positional offset in the laminated plates tends to occur when these are subjected to vibration or impact, but, by the position-restricting locations applying tensioning force from both sides, displacement of the electrode sheets is prevented by positional a restriction of their side faces.

By forming position-restricting locations so as to surround at least the four corners of the secondary battery on the inside face of the pack case, facing the side faces of the secondary battery, the secondary battery of rectangular shape is restricted in position by the position-restricting locations at the four corners, so displacement of the laminated electrode plates cannot occur even when these are subjected to impact or vibration, and internal short-circuiting etc. due to displacement of the electrode plates can thus be prevented.

BRIEF DESCRIPTION OF THE DRAWINGS

FIG. 5 is a side view of a bottom case illustrating the arrangement of a terminal mounting portion;

FIG. 6 is a cross sectional view given in explanation of mounting of an external connection terminal and its bonding with a positive electrode connection lead;

FIG. 7 is a cross-sectional view given in explanation of the mounting construction of a negative electrode connection lead and a test terminal;

FIG. 8 shows the way in which a battery protective device is arranged, FIG. 8A being a plan view and FIG. 8B being a side view;

FIG. 9A is a cross sectional view illustrating how a positive electrode lead and positive electrode connection lead are bonded, and FIG. 9B is a cross sectional view illustrating the condition in which the leads are packed away;

FIG. 11 is given in explanation of deformation of a resiliently deformable face, FIG. 11A being a cross-sectional view in the normal condition and FIG. 11B being a cross sectional view seen in the direction of the arrows along the line A—A of FIG. 10A when the battery has expanded;

FIG. 25A is a plan view of an external casing and FIG. 25B is a cross sectional view seen in the direction of the arrows along the line E—E of FIG. 25A;

FIG. 26 illustrates the construction of a battery, FIG. 26A being a plan view, and FIG. 26B being a side view;

FIG. 28A is a cross sectional view seen in the direction of the arrows along the line C—C of FIG. 27, and FIG. 28B is a cross-sectional view seen in the direction of the arrows along the line B—B of FIG. 27;

FIG. 29A is a cross-sectional view seen in the direction of the arrows along the line G—G of FIG. 27, and FIG. 29B is a cross-sectional view seen in the direction of the arrows along the line F—F of FIG. 27.

BEST MODE FOR CARRYING OUT THE INVENTION

Hereinbelow, preferred embodiments of the present invention will be described with reference to the accompanying drawings, these being provided for understanding of the present invention. An example is illustrated in which the battery pack of this embodiment constitutes a battery power source of a mobile telephone.

Figure 1:
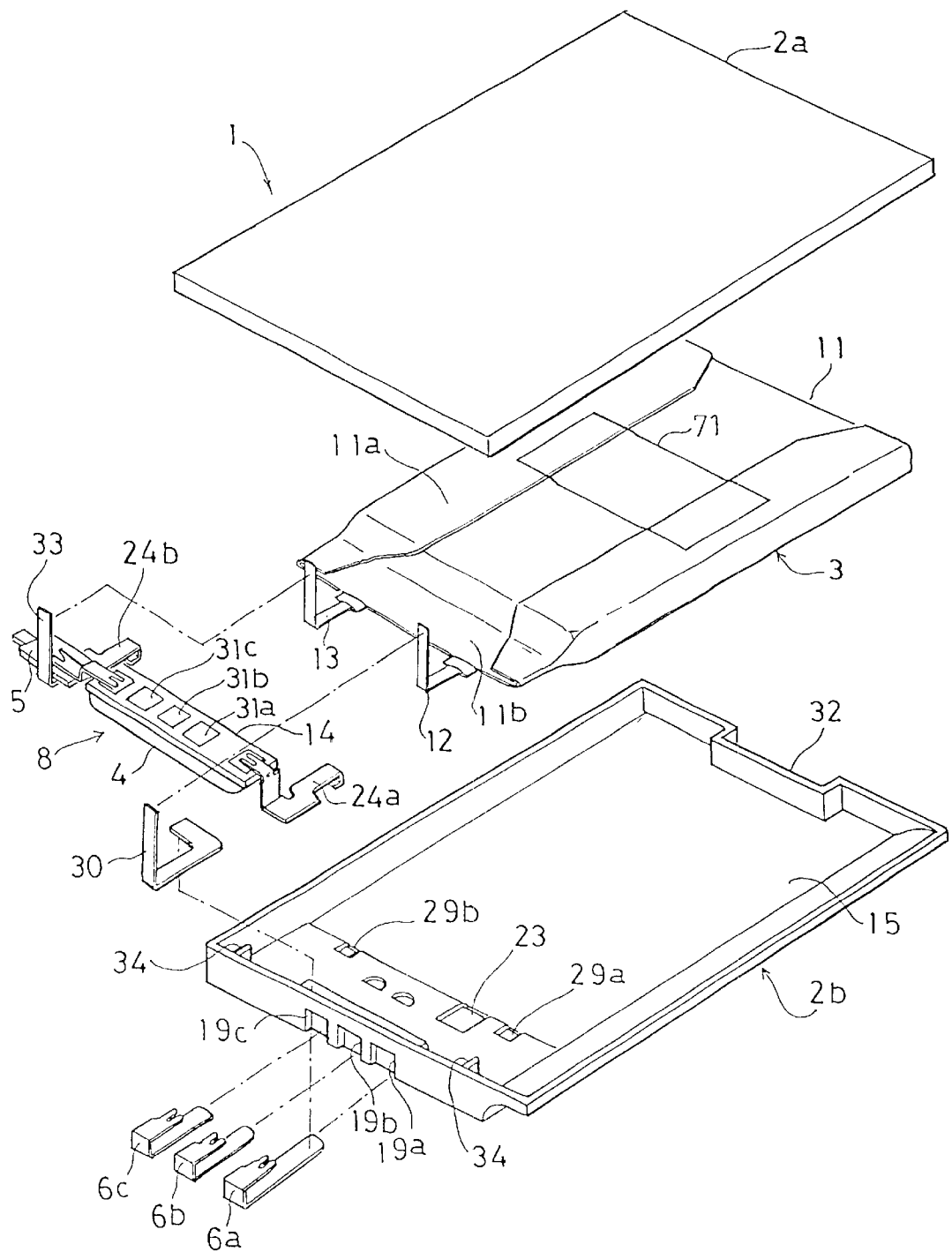
FIG. 1 is an exploded perspective view illustrating the construction of a battery pack according to a first embodiment.

FIG. 1 is an exploded view showing the construction of a battery pack according to a first embodiment. Battery pack 1 accommodates a battery 3 constituted as a lithium polymer secondary battery within a pack case 2 comprising a top case 2a and bottom case 2b, and a battery protective device 8 constituted of a safety unit (hereinbelow abbreviated to SU) 4 comprising a protection circuit that protects this battery 3 and a PTC element 5, which is a critical temperature resistance element. Battery pack 1 is equipped with external input/output terminals 6a, 6b, and 6c for electrical connection with a mobile telephone.

This battery pack 1 is constituted such that it can be removably fitted onto a mobile telephone; top case 2a constituting pack case 2 constitutes part of the external casing of the mobile telephone. Top case 2a is therefore formed so as to provide strength and an attractive appearance as the external casing of the equipment. This top case 2a and bottom case 2b are formed by resin molding, battery 3 and battery protection device 8 being accommodated therein, the two cases being integrated by bonding.

Figure 2A:
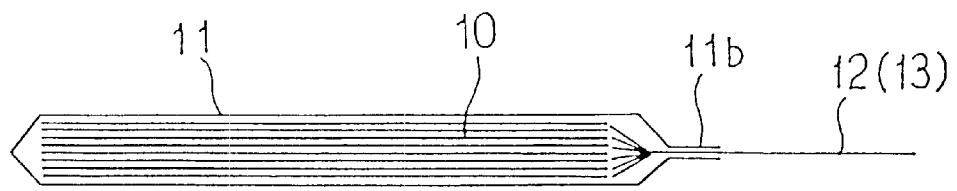
FIG. 2 illustrates diagrammatically the overall construction of the battery, FIG. 2A being a cross sectional view and FIG. 2B being a plan view.
Figure 2B:
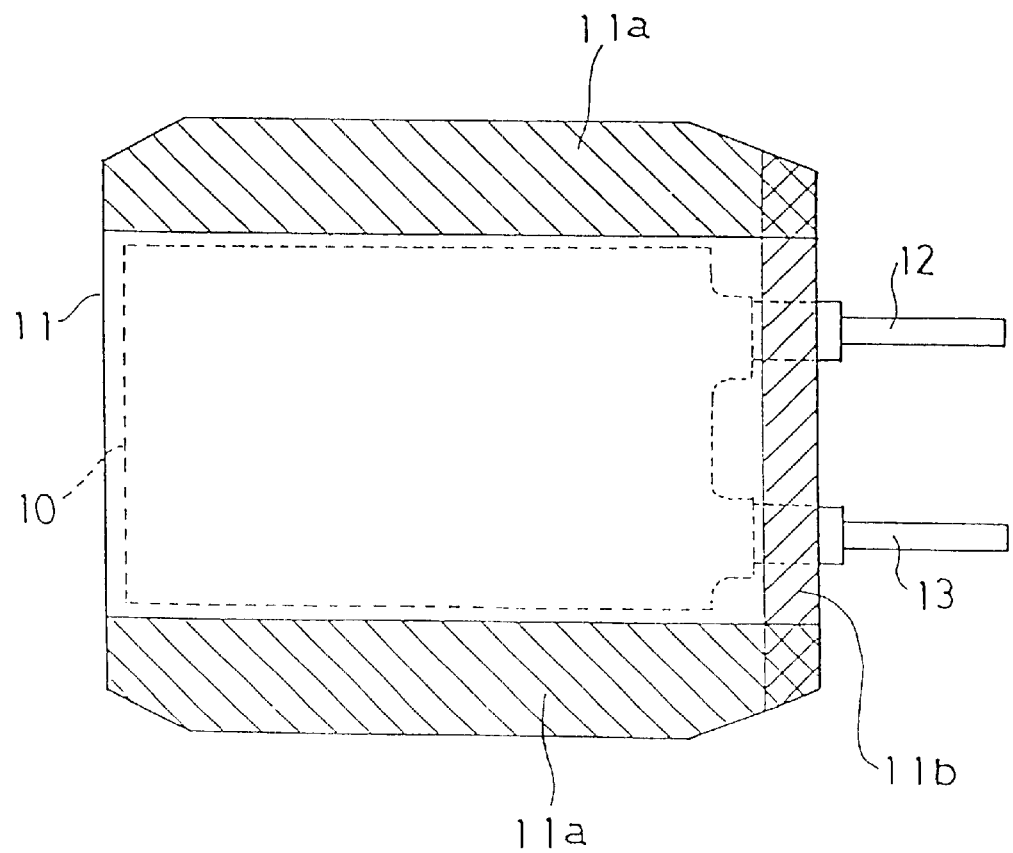

Battery 3, whose diagrammatic construction is shown as a cross sectional view in FIG. 2A, is constituted by accommodating, within a flexible external casing 11 including a laminated sheet, electricity generating elements 10 formed by laminating in a plurality of layers with intervening separators consisting of polymer electrolyte sheet positive electrode plates and negative electrode plates formed as sheets. As shown in FIG. 2B, to form this external casing 11, a rectangular laminated sheet is folded in half and the shaded portions on both sides are sealed by welding to form a pocket shape which accommodates electricity-generating elements 10. Positive electrode lead 12 extends from the positive electrode plate, and negative electrode lead 13 extends from the negative electrode plate, constituting electricity-generating elements 10 and side 11b is sealed by welding so as to seal the interior of external casing 11. As shown in FIG. 1, reduction of the planar space is achieved by folding back the sealed sides 11a on both sides onto the flat plate side. The sealed sides 11a that are folded back on both sides are fixed onto the plane surface by sticky tape 71. Even if the aforesaid electricity-generating elements 10 are compression-formed into a flat plate shape with the positive electrode plates and negative electrode plates coiled, the positive and negative electrode plates are in a laminated condition in the thickness direction, so a construction which is identical with the laminated construction described above can be produced.

Figure 3:
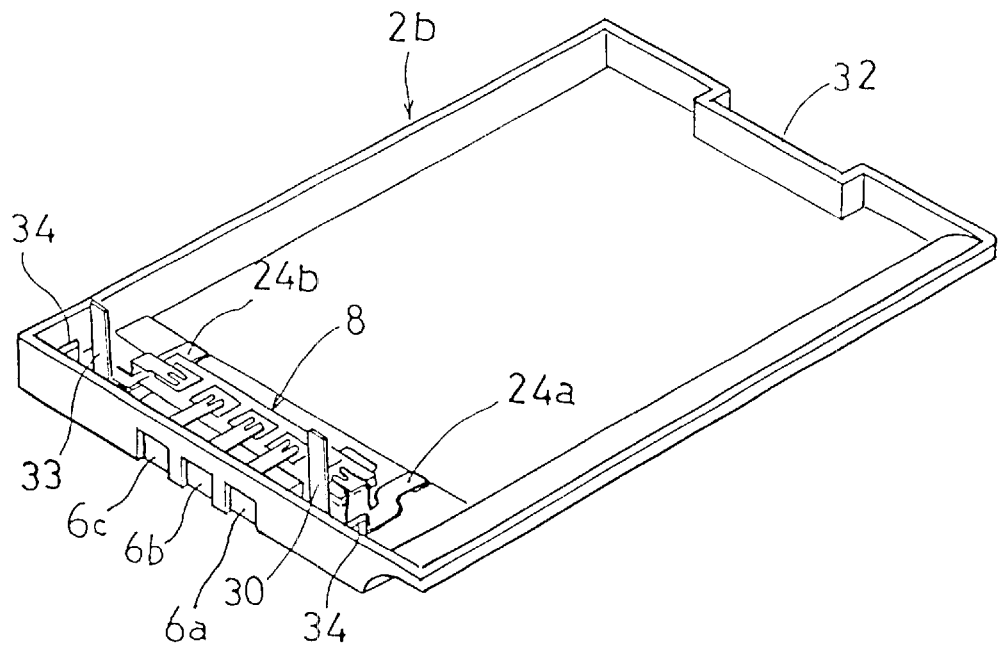
FIG. 3 is a perspective view illustrating how a battery protection device is arranged in a bottom case.
Figure 4:
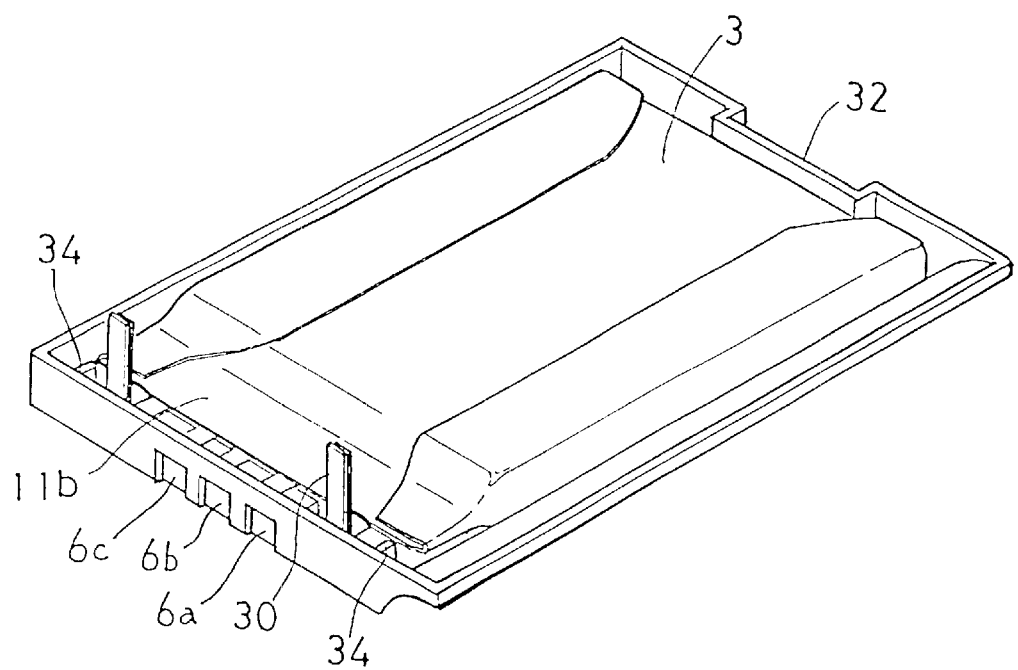
FIG. 4 is a perspective view illustrating how a battery protective device and battery are arranged in a bottom case.

Also, battery protection device 8 comprises an SU 4 in which a protection circuit is constituted on circuit board 14 for protecting battery 3 from over-discharge or over-charging by controlling the charging/discharging current, and a PTC element 5 for protecting battery 3 from excessive discharge current due to for example short-circuiting, and is supplied in an assembled condition as shown in FIG. 1. As shown in FIG. 3, this battery protection device 8 is mounted with the plate surface direction of circuit board 14 and PTC element 5 parallel with the flat plate surface of battery 3 at the edge position where external input/output terminals 6a~6c of bottom case 2b are mounted. AS shown in FIG. 4, the battery pack is completed by mounting this battery protection device 8 on bottom case 2b, then accommodating battery 3 within bottom case 2b, and bonding the top case 2a and bottom case 2b after connecting the positive electrode lead 12 and negative electrode lead 13 extending from battery 3 with battery protection device 8.

The procedure for arranging battery 3, battery protection device 8 and external input/output terminals 6a~6c within bottom case 2b is performed as described below.

As shown in FIG. 1, in the 90° direction from the side face of bottom case 2b to the back face side thereof, terminal mounting parts 19a, 19b, 19c are formed as respective recesses; in the bottom face of each recess, as shown in FIG. 5, there are formed slit-shaped terminal insertion holes 22 in two, upper and lower, locations. As shown in FIG. 1, external input/output terminals 6a, 6b, and 6c formed in U-shape are press-inserted from both respective tips into these terminal insertion holes 22. One of the tips of external input/output terminal 6a constituting the positive electrode terminal is formed particularly long, so that, when it is mounted in bottom case 2b, the insertion tip is positioned above a bonding hole 23 formed in bottom case 2b, and the insertion tip projects from bonding hole 23. The end of positive electrode connection lead 30 shown in FIG. 1 is overlaid on the insertion tip on this connection hole 23, and these two are bonded by spot welding. FIG. 6 is a cross-sectional view showing how external input/output terminal 6a is mounted and how positive electrode connection lead 30 is bonded. The end of positive electrode connection lead 30 is placed on top of the insertion tip of external input/output terminal 6a, so that, as indicated by the upper and lower arrows, one side of the welded electrode is inserted from connection hole 23 and contacts the insertion tip of external input/output terminal 6a, while the other side thereof contacts positive electrode connecting lead 30 and is spot-welded, these two being thereby bonded.

Each of the external input/output terminals 6a~6c is pressure-inserted from upper and lower terminal insertion holes 22, 22 so as to be thereby fitted into bottom case 2b, and is bonded to each of the constituent elements arranged within bottom case 2b, so that a reliable mounting construction is produced. Also, as shown in FIG. 6, they are mounted in a condition adhering to the bottom face of terminal mounting parts 19a~19c. Therefore, when battery pack 1 is mounted on the mobile telephone, even though it is subjected to pressure from a connecting probe 44 that makes pressure contact in order to effect electrical connection, a reliable connection condition is obtained, so that an electrical connection is achieved with little connection resistance.

Next, as shown in FIG. 3, battery protection device 8 is arranged at the end of bottom case 2b with positional location achieved by fitting in of a pair of test terminals 24a, 24b provided on battery protection device 8 into a pair of test terminal windows 29a, 29b formed in bottom case 2b. FIG. 7 is a cross-sectional view showing the condition of arrangement of test terminal 24b. The tip of test terminal 24b is bent into a U shape to constitute a portion that is inserted into one side of test terminal window 29b so that it is located in position, and its tip is simultaneously fixed to bottom case 2b. The tips of test terminals 24a, 24b are positioned such as to project to the outside through test terminal windows 29a, 29b, so that they can be used for electrical inspection by connection of an inspection probe 43 on inspection during manufacture after completion of a battery pack 1. The base end of this test terminal 24b forms a connection part with PTC element 5 and furthermore a portion extending in the right-angle direction thereof serves as the negative electrode connecting lead 33 for connection of negative electrode lead 13 of battery 3.

When battery protection device 8 is located in position on bottom case 2b, as shown in FIG. 8, circuit board 14 that constitutes SU 4 is arranged below each of the external input/output terminals 6a, 6b, 6c that are mounted on bottom case 2b, so that the respective input/output terminals 6a, 6b, 6c are in a contacting condition with soldering lands 31a, 31b, 31c that are formed on circuit board 14. At the same time as terminal connection is effected by soldering of respective external input/output terminals 6a, 6b, 6c to these soldering lands 31a, 31b, 31c, the external input/output terminals 6a~6c and battery protection device 8 are fixed in position on bottom case 2b. After soldering has been completed, the soldered surface of circuit board or 14 is over-coated with insulating material so as to ensure electrical insulation and to prevent liquid short-circuiting or corrosion from occurring in the event of leakage of electrolyte from battery 3.

As shown in FIG. 8B, the plate surface of circuit board 14 and PTC element 5 is arranged parallel to the bottom surface of bottom case 2b, so the space in the thickness direction of the portion where battery protection device 8 is accommodated can be reduced. Furthermore, as shown in FIG. 4, miniaturization of battery pack 1 is improved without creating unnecessary spaces within pack case 2, since a space can be created that accommodates the lead connection side 11b in the thickness direction of battery 3 on battery protection device 8. Also, the positive electrode lead 12 and the negative electrode lead 13 coming from battery 3 are prevented from contacting battery protection device 8 since the lead connection side 11b covers the upper surface of battery protection device 8. When this battery protection device 8 is mounted, the negative electrode connection lead 33 and positive electrode connection lead 30 on the battery protection device 8 are arranged in an erect condition at the end of bottom case 2b.

Next, as shown in FIG. 4, battery 3 is accommodated in bottom case 2b such that its lead connection side 11b faces battery protection device 8. Battery 3 is arranged such that its lead connection side 11b covers the top of battery protection device 8, its position of accommodation being located in position between a recess 32 formed in bottom case 2b and a position-location projection 34. The positive electrode lead 12 coming from lead connection side 11b of this battery 3 faces positive electrode connection lead 30, and negative electrode lead 13 coming from lead connection side 11b of this battery 3 faces negative electrode connection lead 33, respectively. Bonding is effected by spot welding between these positive electrode lead 12 and positive electrode connection lead 30 and between negative electrode lead 13 and negative electrode connection lead 33.

FIG. 9 shows the connection between positive electrode lead 12 and positive electrode connection lead 30. Positive electrode lead 12 is formed of aluminum of thickness 80 μm, and is connected by spot welding with positive electrode connection lead 30 which is formed of nickel. Negative electrode lead 13 is formed of copper of thickness 80 μm, and is likewise connected by spot welding with negative electrode connection lead 33.

As shown in FIG. 9A, positive electrode lead 12 and positive electrode connection lead 30 are bonded, then, as shown in FIG. 9B, they are bent over onto lead connection side 11b of battery 3. Identical bending is also effected in respect of the location of bonding of negative electrode lead 13 and negative electrode connection lead 33. Since lead connection side 11b is present between this folded-over portion and battery protection device 8, there is no possibility of abnormalities being produced by contact of positive electrode lead 12 and negative electrode lead 13 with battery protection device 8. Also, insulation is more reliably ensured thanks to the application of over-coating to the soldered surface of circuit board 14 after soldering of external input/output terminals 6a~6c as described above.

Thus, since positive electrode lead 12 and negative electrode lead 13 exit from the same side of battery 3 and battery protection device 8 is arranged at the side of this lead connection side 11b, there is no possibility of the leads for connection between battery 3 and battery protection device 8 having to adopt a circuitous route. External input/output terminals 6a~6c and battery protection device 8 are fixed in prescribed positions of bottom case 2b, so the connection between the various structural elements accommodated in pack case 2 is made rigid and reliable, making it possible to provide a battery pack 1 which has rigidity in addition to the small thickness that is required for use with mobile equipment.

In the above construction, an insulating sheet may suitably be arranged between lead connection side 11b of battery 3 and battery protection device 8. Since resin layers are formed in a plurality of layers on both faces of the metallic layers (aluminum) in the laminated sheet that forms the external casing 11, if vibration or shock results in contact with the metallic portions of battery protection device 8, there is a risk of short-circuiting being produced if the resin layers on the outside surface are destroyed, allowing touching with the metallic layer. Contact between the lead connection side 11b and the battery protection device 8 is prevented if an insulating sheet is arranged as described above. Also, if insulating sheets are arranged on both faces of lead connection side 11b, contact between lead connection side 11b and the respective bonding locations of positive electrode lead 12 and positive electrode connection lead 30 and negative electrode lead 13 and negative electrode connection lead 33 can be prevented.

After the various constituent elements have been accommodated in bottom case 2b by the steps described above, top case 2a is bonded to bottom case 2b by ultrasonic welding, so as to assemble a thin battery pack 1 as shown in FIG. 10. After this assembly, an inspection is performed to ascertain whether or not battery pack 1 is operating normally, by inserting an inspection probe 43 into test terminal windows 29a and 29b to bring it into contact with test terminals 24a and 24b. If battery pack 1 passes the inspection, its aperture portions are closed by sticking a masking sheet onto recess 35 where the test terminal windows 29a, 29b and bonding window 23 etc. are provided.

Figures 10A, 10B:
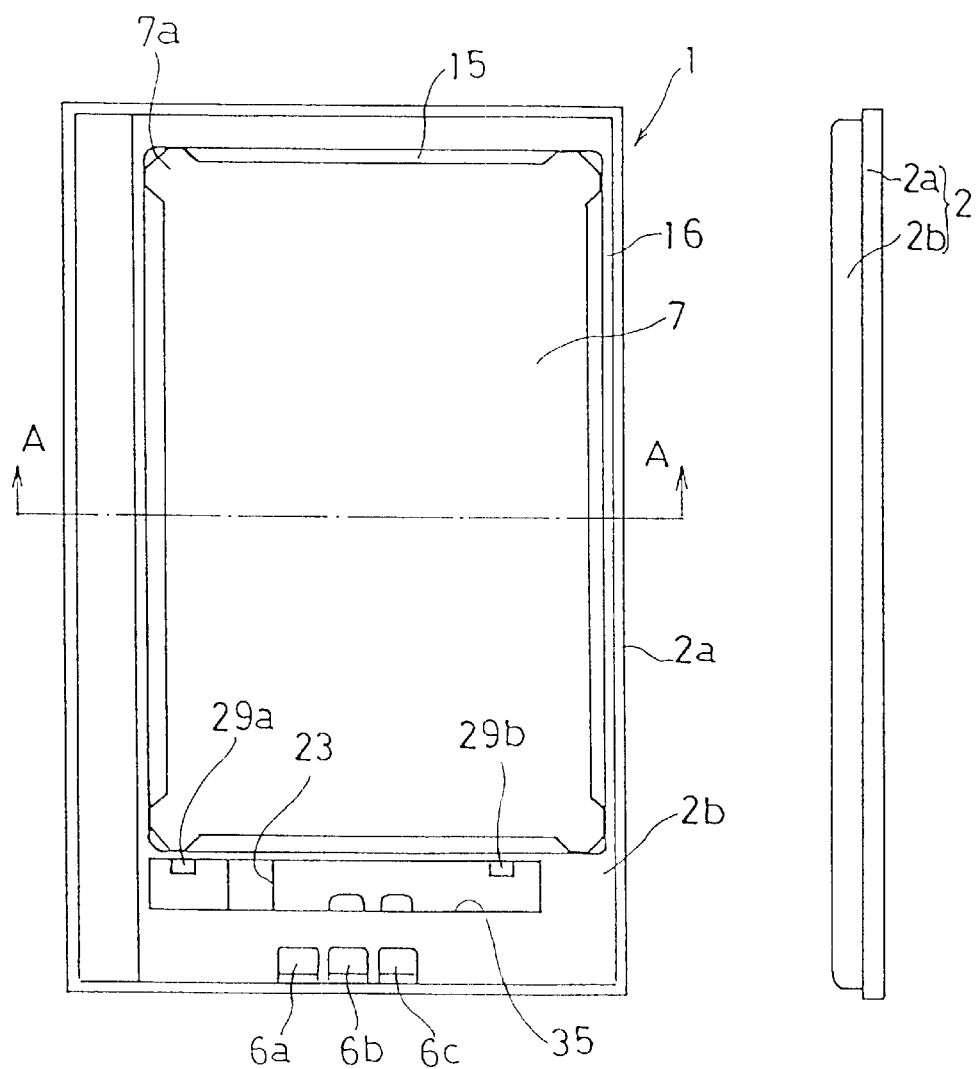
FIG. 10 illustrates the completed condition of the battery pack, FIG. 10A being a plan view and FIG. 10B being a side view.

FIG. 10A is a bottom plan view of battery pack 1 seen from the side of bottom case 2b. The face of bottom case 2b facing the flat plate face of battery 3 is formed with small thickness, being formed as a resiliently deformable face 15 that deforms resiliently when the thickness of battery 3 changes due to expansion. Also, a peripheral portion 16 is formed that is formed in projecting fashion so as to surround this resiliently deformable face 15. Also, since resiliently deformable face 15 is formed of small thickness, in order to prevent battery 3 being damaged by piercing with sharp objects etc., a thin sheet of stainless steel (thin metal sheet) 7 is stuck onto the area of resiliently deformable face 15 excluding its peripheral area. At the corners of this thin stainless steel sheet 7, there are formed projections 7 that abut the peripheral portion 16, being constructed such as to achieve positional location when thin stainless steel sheet 7 is stuck onto resiliently deformable face 15.

If this thin stainless steel sheet 7 is stuck onto the entire surface of resiliently deformable face 15 and the thickness of thin stainless steel sheet 7 is made the minimum thickness for obtaining sufficient strength in regard to piercing, there is no possibility of impeding resilient deformation of resiliently deformable face 15, since this then deforms tracking the deformation of resiliently deformable face 15 even in the peripheral region of resiliently deformable face 15, where the amount of deformation is large.

FIG. 11 shows a cross section along the direction of the arrows of line A—A of FIG. 10A; in this construction, resiliently deformable face 15 is formed of small thickness of 0.22 mm, and a peripheral portion 16 of prescribed height is formed at the periphery of this resiliently deformable face 15. The projecting height of peripheral portion 16 is formed such that a step H is produced between the peak of this circumferential portion 16 and the surface of thin stainless steel sheet 7 that is stuck onto resiliently deformable face 15. In the present construction, step H is set at 0.4 mm.

The thickness of battery 3 is increased by expansion of the electrode plates produced by repeated charging/discharging and/or change over time. When the increase of thickness of battery 3 due to expansion exceeds the height of the battery accommodation space between top case 2a and bottom case 2b, resilient deformation is produced with resiliently deformable face 15, which is made easily deformable by being formed of small thickness, being pushed outwards by the pressure produced by the expansion of battery 3. Since the expansion of the electrode plates is manifested as a change in thickness of battery 3 as a whole, the surface of resiliently deformable face 15 contacting battery 3 is pushed up evenly, with the resilient deformation occurring, as shown in FIG. 11B, in the peripheral portions adjacent peripheral portion 16. The thickness of the lithium polymer secondary battery used as battery 3 is 3.91 mm, and the data have been obtained that the thickness produced by swelling over the entire life caused by repeated charging and discharging is 4.31 mm, representing an expansion of 0.4 mm. Since, as described above, a space is formed due to the step H of height 0.4 mm surrounded by the peripheral portion 16 on the resiliently deformable face 15, even in the condition where the entire life of the battery pack 1 has elapsed, the maximum thickness of battery pack 1 does not change. Also, thanks to the thin stainless steel plate 7 that is stuck onto the surface of resiliently deformable face 15 with the exception of its periphery, expansion takes place uniformly within the peripheral portion 16, maintaining a flat-surface condition, due to resilient deformation of the periphery, as the average thickness of battery 3 changes. Thus the fact that the surface facing the battery is formed by a rigid body avoids the possibility that expansion of the battery will result in the production of an arcuate swelling, giving a feeling of disconformity regarding the shape of the battery pack or adversely affecting equipment in which it is loaded, due to the arcuate swelling.

Figure 12:
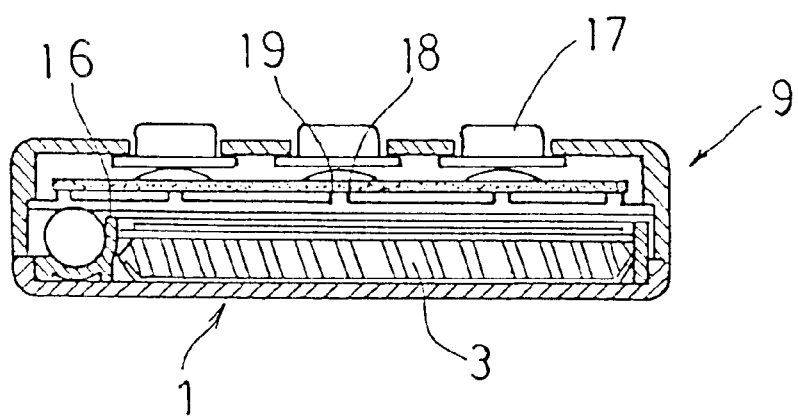
FIG. 12 is a cross sectional view illustrating the condition in which the battery pack is fitted to a mobile telephone.

As shown in the form of a cross-sectional view in FIG. 12, a battery pack 1 constructed as above is loaded in a mobile telephone 9. Corresponding to the reduction in thickness of battery pack 1, mobile telephone 9 itself is also reduced in thickness, thereby achieving a mobile telephone 9 of a slim shape that can be inserted in a pocket. On the opposite face of mobile telephone 9 to that where battery pack 1 is loaded (i.e. the front face), there are provided push keys 17 and a multi-layer circuit board 18 formed with contacts circuitry operated by these push keys 17, and a support plate 19 that supports this multi-layer circuit board 18; between this support plate 19 and battery pack 1, there are provided a gap of about 0.05 mm with respect to peripheral portion 16 and a gap of about 0.45 mm with respect to thin stainless steel sheet 7 which is stuck onto resiliently deformable face 15.

With this construction, when a strong pressing force is applied from the outer surface of mobile telephone 9, peripheral portion 16 performs the action of supporting deformation of support plate 19. Also, even when the thickness of battery 3 increases due to swelling of the electrode plates resulting from secular changes, resiliently deformable face 15 is resiliently deformed in response to the expansion of battery 3 but the change of thickness produced by the swelling is accommodated in the space formed in the middle surrounded by peripheral portion 16 as described above and so the equipment cannot be affected by such swelling.

Figure 13:
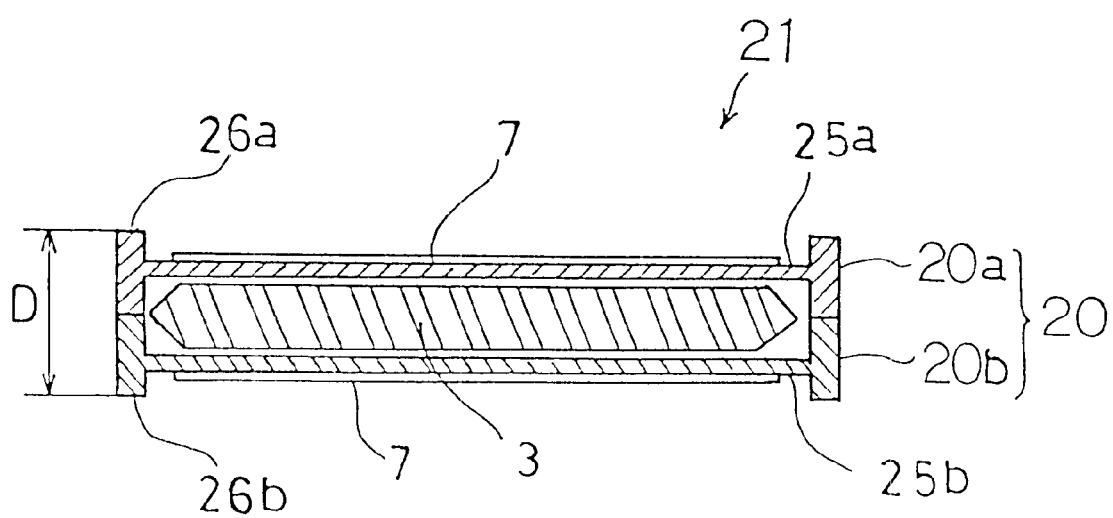
FIG. 13 is a cross-sectional view showing the construction of a battery pack according to a second embodiment.
Figure 14:
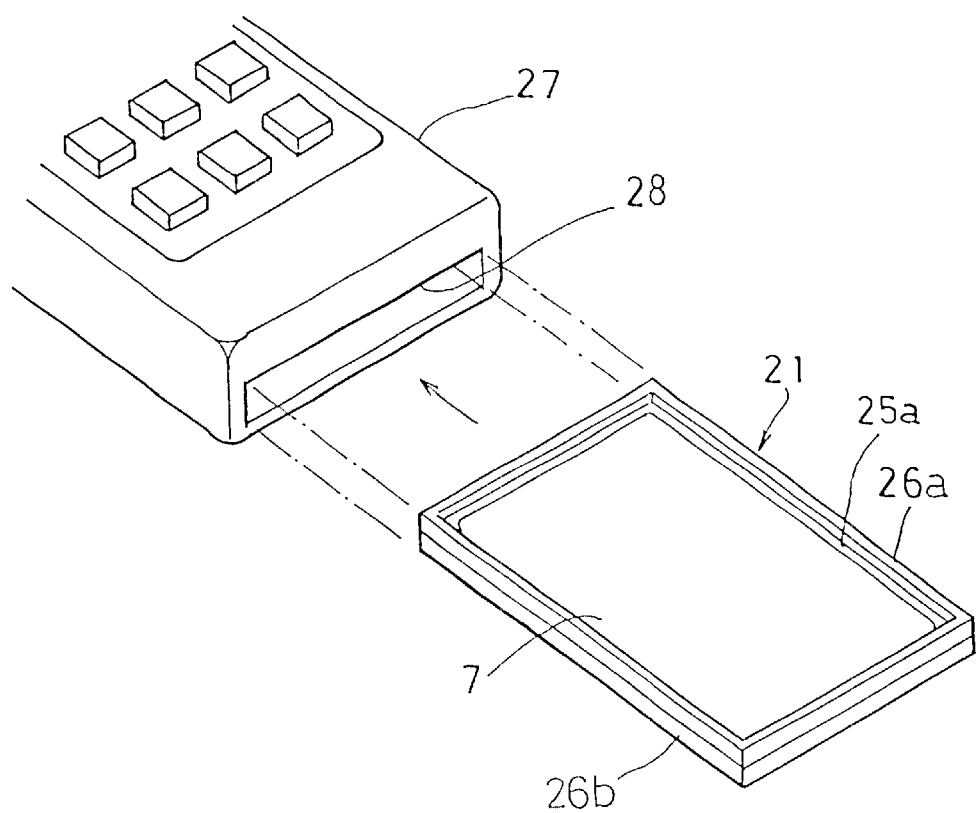
FIG. 14 is a perspective view showing the condition in which the battery pack of the second embodiment is fitted to a mobile telephone.

Next, a second embodiment of the present invention will be described. FIG. 13 is a cross sectional view illustrating the construction of a battery pack 21 according to a second embodiment. As shown in FIG. 14, this battery pack 21 is of a construction that is capable of being loaded by insertion into a battery accommodating port 28 that is provided in mobile telephone 27. Elements whose construction is common with that of the first embodiment are given the same reference symbols, and further description thereof is omitted.

In battery pack 21, pack case 20 that accommodates battery 3 formed as a laminated lithium polymer secondary battery is integrally constructed by bonding a top case 20a and a bottom case 20b that are correspondingly formed in the same shape by resin molding. The two faces of this pack case 20 that are opposite the flat plate faces of battery 3 are formed as resiliently deformable faces 25a, 25b that are respectively formed of small thickness, peripheral portions 26a, 26b being formed in projecting fashion at their respective peripheries. Also, thin stainless steel plates 7, 7 are stuck onto the respective outer surfaces of resiliently deformable faces 25a, 25b, with the exception of the peripheral region.

When battery 3 of battery pack 21 of this construction expands, resiliently deformable faces 25a, 25b are resiliently deformed, expanding outwards. However, since peripheral portions 26a, 26b are present at their peripheries, forming spaces in the outwards directions of resiliently deformable faces 25a, 25b, the swelling of resiliently deformable faces 25a, 25b produced by expansion of battery 3 cannot exceed the circumferential portions 26 which constitute the maximum thickness of battery pack 21. Also, since resiliently deformable faces 25a, 25b are formed overall of small thickness and the thickness of laminated battery 3 expands uniformly, resiliently deformable faces 25a, 25b are resiliently deformed in the circumferential region adjacent respective circumferential portions 26a, 26b, with the result that expansion takes place while maintaining the flat surface condition. Also because the thin stainless steel sheets 7 are stuck on to the resiliently deformable faces 25a, 25b with the exception of the peripheries of their respective surfaces, swelling takes place uniformly, maintaining a flat-face condition, thanks to resilient deformation of the peripheries, in a condition with these adhering to battery 3 at their inside faces. Consequently, the height of the aperture of the battery accommodating port 28 of the equipment can be based on the thickness D of battery pack 21, which is determined by the height between peripheral portions 26a, 26b, so that there is no possibility of insertion of battery 3 becoming impossible due to expansion. Furthermore, there is no possibility of a feeling of disconformity being produced in the shape of the battery pack caused by arcuate swelling on expansion of the battery.

Figure 15A:
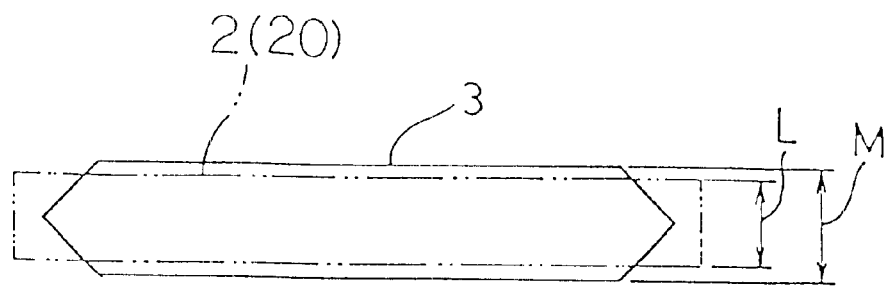
FIG. 15A and FIG. 15B are diagrams given in explanation of the construction whereby the battery is pressurized in a compression direction by a resiliently deformable face.
Figure 15B:
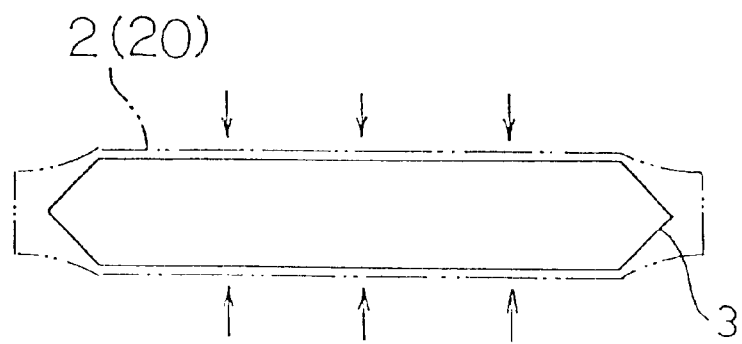

In the constructions of the first and second embodiments described above, the dimension in the thickness direction of the accommodation space of battery 3 within pack cases 2, 20 is basically made of a dimension somewhat larger than the thickness of battery 3 in order to allow for dimensional error of the thickness of battery 3. However, due to the construction permitting resilient deformation of resiliently deformable 15 face 15 on one side in the case of pack case 2 or of resiliently deformable faces 25a, 25b on both sides in the case of pack case 20, as shown in diagrammatically in FIG. 15A, the dimension L in the thickness direction of the accommodating space of battery 3 within case 2 or 20 can be formed smaller than the thickness dimension M of battery 3. By accommodating a battery 3 within pack cases 2, 20 formed in this way, as shown in FIG. 15B, battery 3 is constantly subjected to pressure in the compression direction from both faces by resiliently deformable faces 15, 25, conferring the benefit that expansion of the electrode plates is suppressed.

On the contrary, the pack case may be formed with a thickness dimension such as not to be subjected to pressure in the compression direction from resiliently deformable faces 15, 25 in the condition in which battery 3 is not expanded. In such case, if the battery 3 has expanded, it would be subjected to pressure in the compression direction by a force tending to extrude resiliently deformable faces 15, 25, whereby the benefit of suppressing swelling of the electrode plates can be obtained.

Also, if the thickness of the peripheral region, where the amount of deformation is largest, is made smaller than the thickness in other locations, resilient deformation, caused by expansion of battery 3, of the deformable faces 15, 25a, 25b at the peripheral region becomes easier, and the ability to follow the expansion of battery 3 can thereby be increased. Contrariwise, if the thickness of the peripheral region is formed greater than the thickness of the other locations, while deformation becomes more difficult, the pressurizing force on a battery 3 opposing the swelling of battery 3 is increased, thereby applying pressure which suppresses expansion of the electrodes of battery 3, and so enabling expansion of battery 3 to be suppressed.

Figure 16:
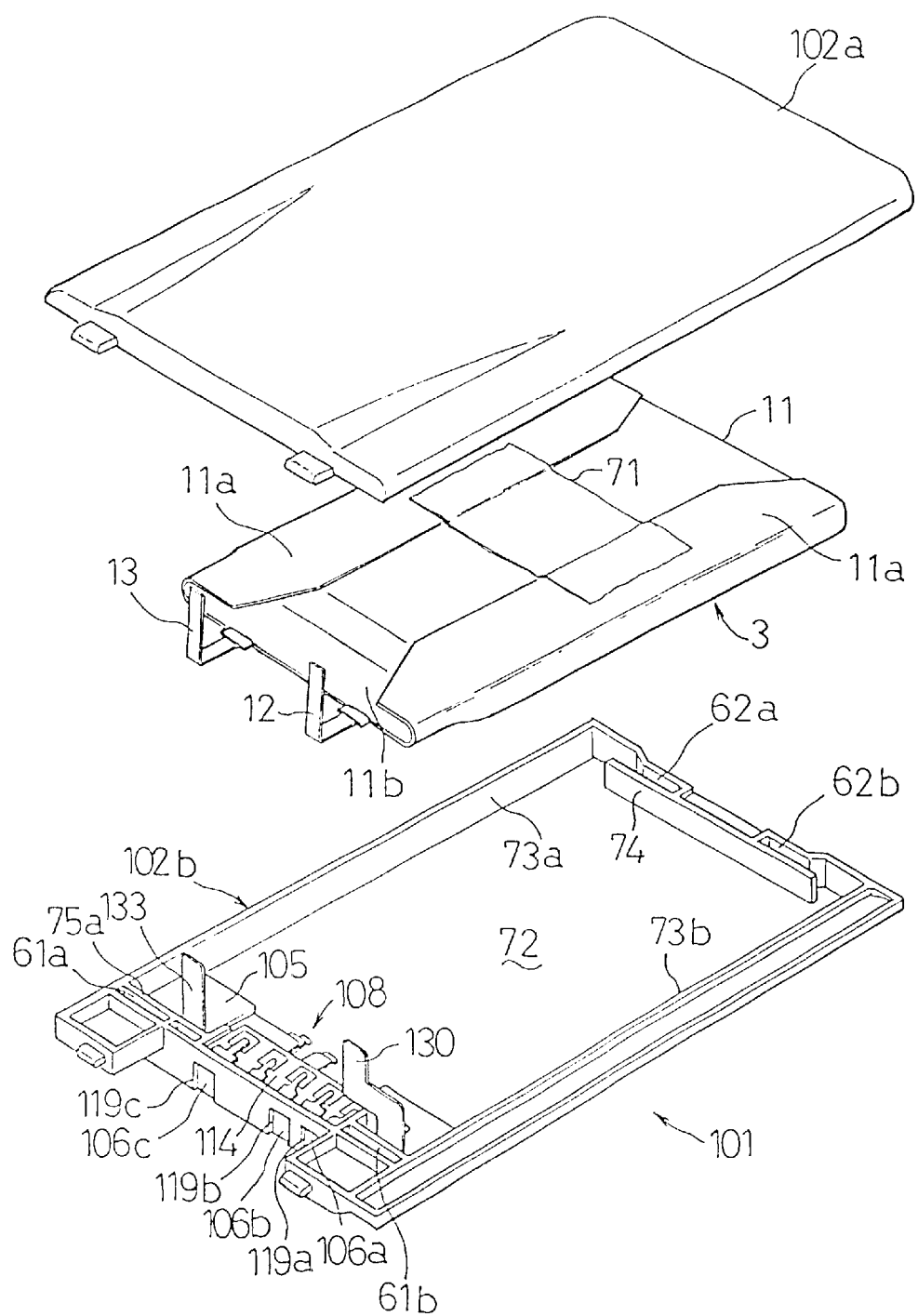
FIG. 16 is an exploded perspective view showing the construction of a battery pack according to a third embodiment.

Next, a third embodiment will be described. FIG. 16 is an exploded view of the construction of a battery pack 101 according to a third embodiment; elements which are common with the construction of the first embodiment are given the same reference symbols, and further description thereof is omitted.

As shown in FIG. 16, battery 3 is accommodated in a battery accommodating space 72 that is left within bottom case 102b after installing battery protection device 108 by mounting respective external input/output terminals 106a, 106b, 106c on terminal mounting recesses 119a, 119b, 119c formed in bottom case 102b.

Figure 17:
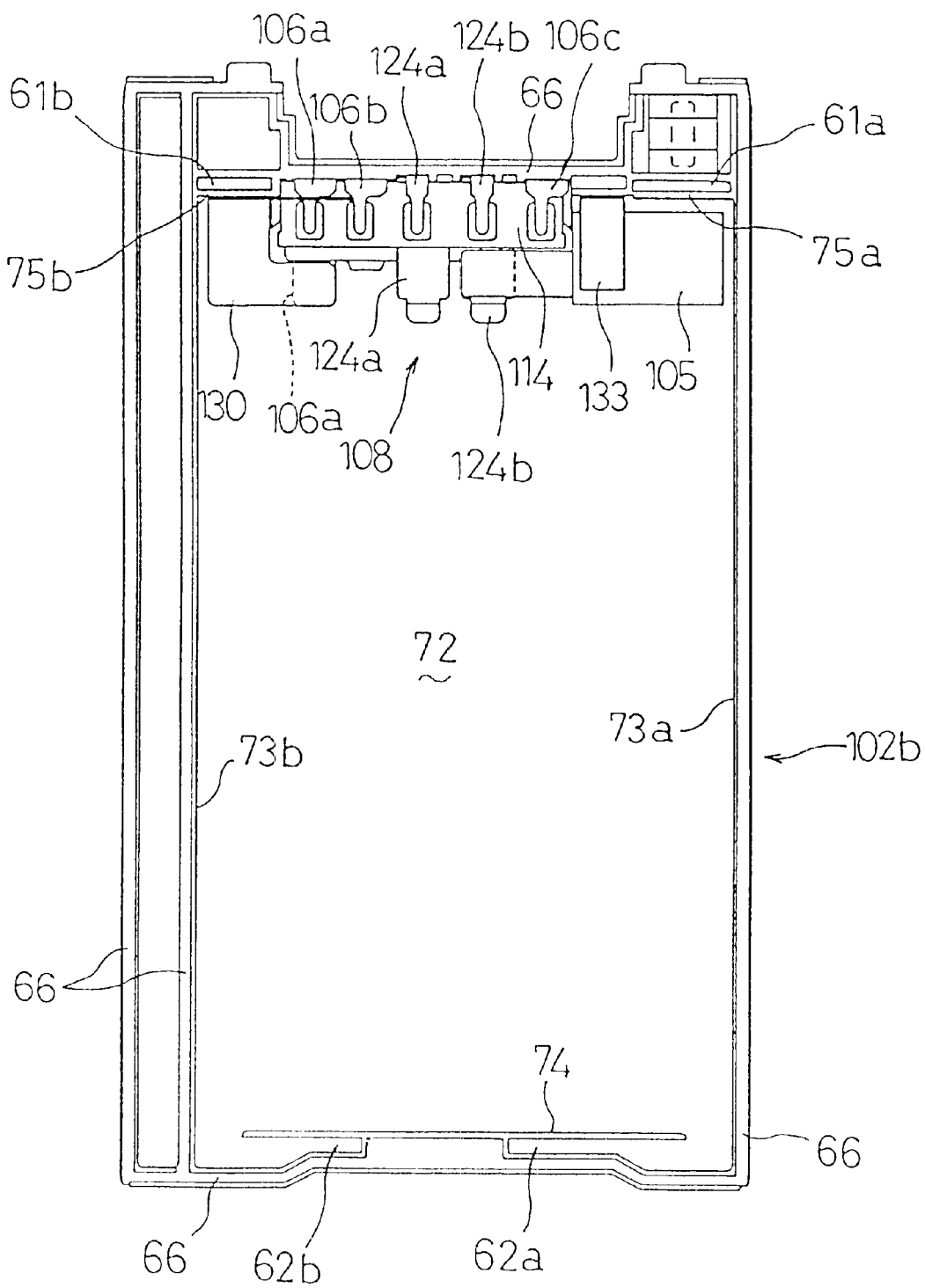
FIG. 17 is a plan view showing the construction of a bottom case.
Figure 18:
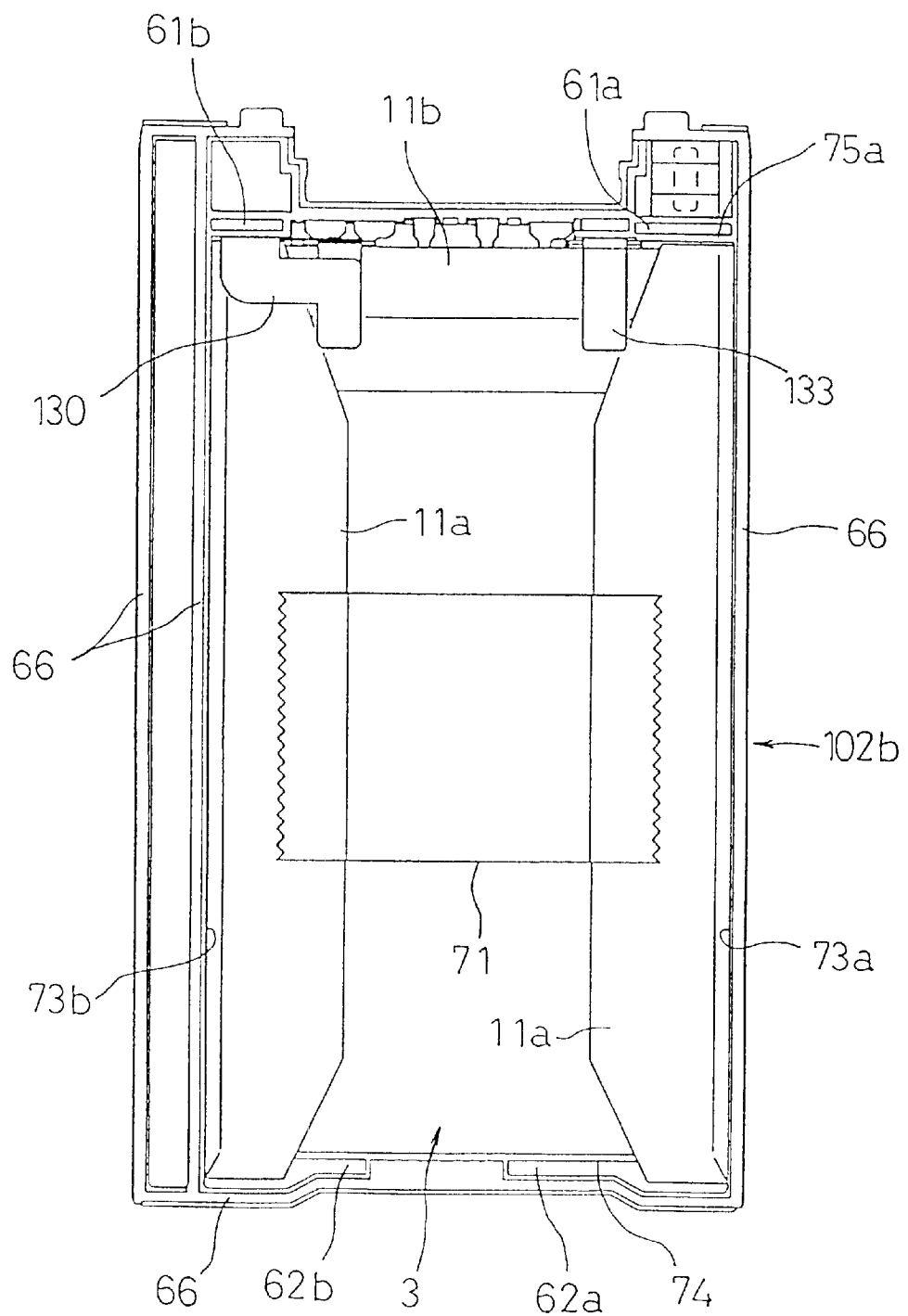
FIG. 18 is a plan view showing the condition in which a battery is accommodated in the bottom case.

As shown in FIG. 17, at the periphery of the aforesaid battery accommodating space 72, there are formed side wall faces 73a, 73b that abut the side faces of battery 3, a bottom wall face 74 that abuts the bottom face of battery 3, and upper wall faces 75a, 75b that respectively abut both ends of battery 3 lead connection side 11b. As shown in FIG. 18, when battery 3 is accommodated in the battery accommodating space 72 enclosed by the aforesaid side wall faces 73a, 73b, bottom wall face 74, and upper wall faces 75a, 75b, at the same time as battery 3 is located in the prescribed position, bottom case 102b is closed by top case 102a, whereupon battery 3 is accommodated within pack case 102 in a condition in which it cannot move from the prescribed position.

Figure 19A:
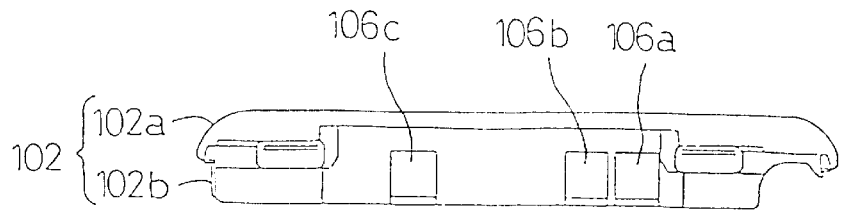
FIG. 19A is a side view of a battery pack and FIG. 19B is a plan view thereof.
Figure 19B:
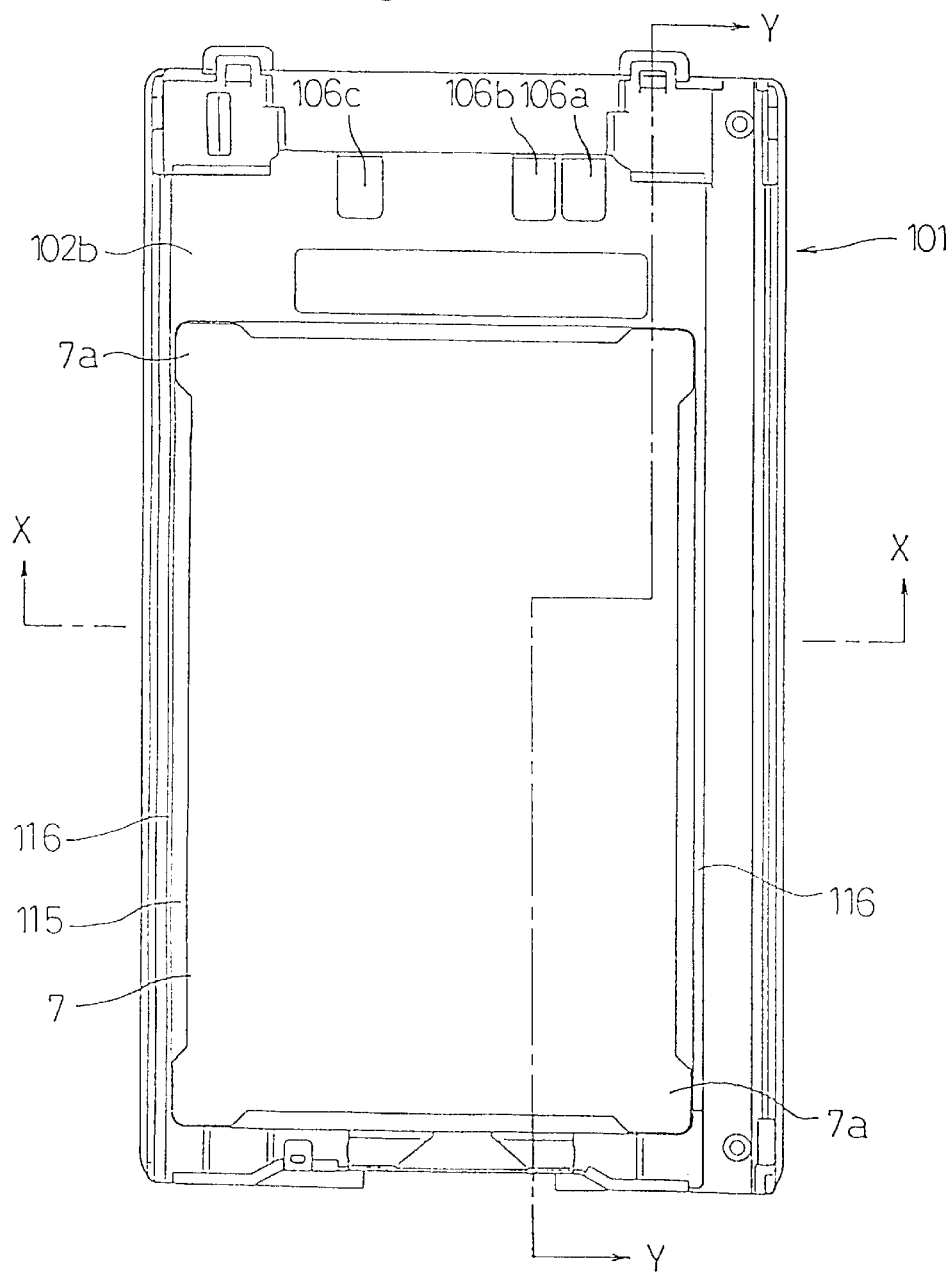

After battery protection device 108 and battery 3 are accommodated in bottom case 102b as described above, assembly with battery pack 101 which is reduced in thickness as shown in FIG. 19 is effected by ultrasonic welding of top case 102a on to bottom case 102b. FIG. 19B is a bottom plan view of battery pack 101 seen from the side of bottom case 102b. The face adjacent the flat face of battery 3 is formed of small thickness, being formed in a resiliently deformable face 115 that deforms resiliently when the thickness of battery 3 changes due to expansion. Also, a peripheral portion 116 is formed that is formed projecting so as to surround this resiliently deformable face 115. Furthermore, since resiliently deformable face 115 is formed of small thickness, it has stuck onto it a thin stainless steel sheet 7 in the area of resiliently deformable face 115 excluding its peripheral portion, in order to prevent battery 3 being damaged by being pierced by sharp objects etc. At the corners of this thin stainless steel sheet 7, there are formed projections 7a that abut the peripheral portion 116, thereby achieving positional location when thin stainless steel sheet 7 is stuck onto resiliently deformable face 115. The action of this construction is the same as in the case of the preceding embodiments, so detailed description thereof is omitted.

Figure 20:
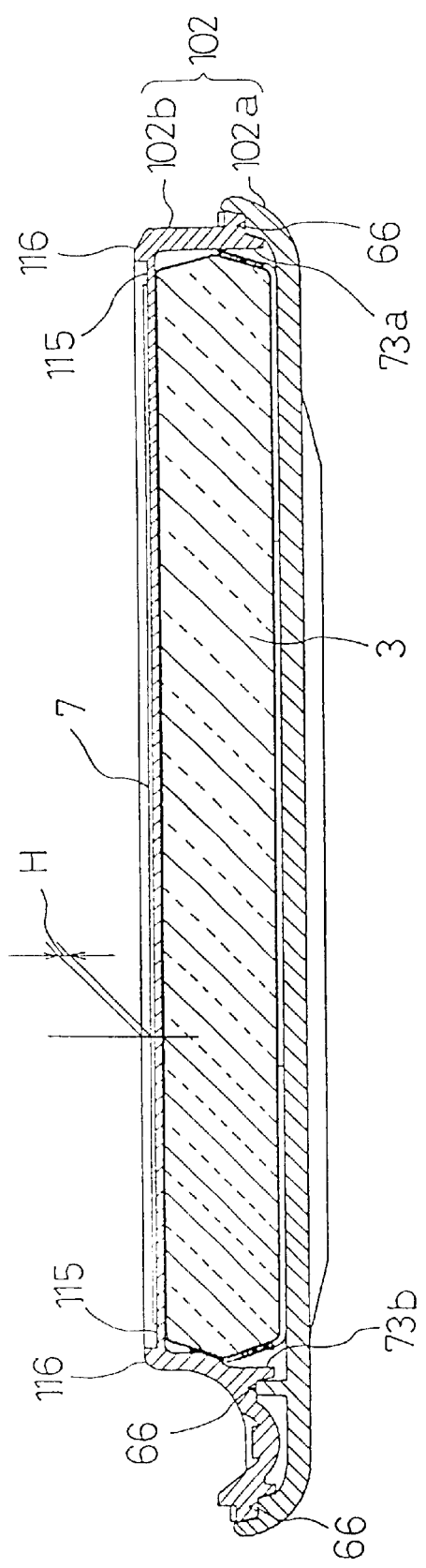
FIG. 20 is a cross-sectional view seen in the direction of the arrows along the line X—X of FIG. 19B.
Figure 21:
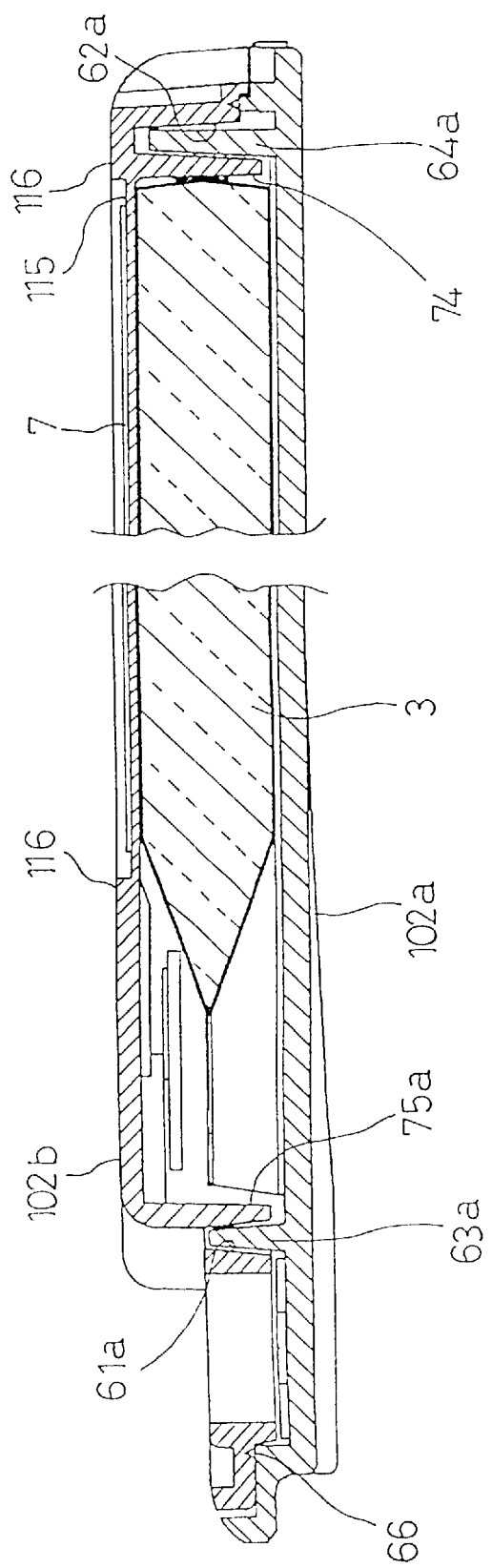
FIG. 21 is a cross-sectional view seen in the direction of the arrows along the line Y—Y of FIG. 19B.

As shown in this construction (the same applies to the constructions of the other embodiments), when a battery 3 is accommodated such as to adhere in the thickness direction within pack case 102, when top case 102a is overlaid on bottom case 102b in which battery 3 is arranged, battery 3 exerts a force tending to push top case 102a upwards. As shown in FIG. 20 and FIG. 21, the fitting depth at the fitting location at the periphery where ultrasonic welding is effected between bottom case 102b and top case 102a is shallow, so there is a risk of mis-positioning of the mutual fitting position of top case 102a and bottom case 102b before they are set in the ultrasonic welder. Therefore a fitting-in construction is provided whereby top case 102a fits bottom case 102b before the ultrasonic welding, in order to prevent mis-positioning of top case 102a from the prescribed position before it can be subjected to this ultrasonic welding.

As shown in FIG. 16 and FIG. 17, upper fitting-in recesses 61a, 61b and lower fitting-in recesses 62a, 62b are formed at both the upper and lower edges of bottom case 102b, so that when top case 102a is made to overlap this bottom case 102b, upper fitting-in projections 63a, 63b and lower fitting-in projections 64a, 64b formed on top case 102a respectively fit into the aforementioned upper fitting-in recesses 61a, 61b and lower fitting-in recesses 62a, 62b, so that top case 102a is fitted into and connected with the bottom case 102b.

FIG. 21 shows a cross sectional view along the direction of the arrows on the line Y—Y in FIG. 19B, and shows the fitted-in condition of the aforesaid upper fitting-in recess 61a and upper fitting-in projection 63a, as well as the fitted-in condition of the aforesaid lower fitting-in recess 61b and lower fitting-in projection 62b. By means of this fitting-in construction, a fitted-in condition of top case 102a in a prescribed position of bottom case 102b is obtained prior to the ultrasonic welding. In this condition, ultrasonic bonding at welding locations 66 at the periphery can be achieved by applying ultrasonic waves between top case 102a and bottom case 102b.

As shown in FIG. 20, the welding location 66 where bottom case 102b and top case 102a are brought into contact in the thickness direction of pack case 102 is arranged close to the outside of side wall faces 73a, 73b formed on bottom case 102b. These welding locations 66 are formed so as to encircle the periphery of pack case 102, being arranged in line as shown in FIG. 17 and FIG. 18. When top case 102a is overlaid on bottom case 102b by fitting together of the aforesaid upper fitting-in recesses 61a, 61b and lower fitting-in recesses 62a, 62b, top case 102a contacts the welding locations 66 on bottom case 102b. By clamping the top case 102a and bottom case 102b which are thus overlaid between a receiving jig and the horn of the ultrasonic welder from the contact direction, top case 102a and bottom case 102b adhere at the aforesaid welding locations 66. By applying ultrasonic vibration from the horn, fusion takes place at the adhering welding locations 66, thus bonding the top case 102a and bottom case 102b, to produce a unified pack case 102. In this way, the deformation strength of the side wall faces 73a, 73b is strengthened by the bonding of top case 102a immediately on the outer side thereof, and the strength in respect of deforming pressure resulting from impacts etc. is improved, enabling the battery 3 which is accommodated to be protected and damage thereto due to impacts to be prevented. Also, as shown in FIG. 21, the deformation strength of upper wall faces 75a, 75b and lower wall face 74 is increased by the upper fitting-in projections 63a, 63b and lower fitting-in projections 64a, 64b that respectively fit into upper fittingin recesses 61a, 61b and lower fitting-in recesses 62a, 62b that are formed to the rear of these.

Also, as shown in FIG. 20 and FIG. 21, since welding locations 66 are set on the inside from the outer exposed face of pack case 102, the fused parts are not exposed to the outside and so do not impair the appearance of battery pack 101. The locations where top case 102a and bottom case 102b adhere in the facing direction are solely constituted by welding locations 66. Since slight gaps are formed in the other locations, there is no possibility of fusion by ultrasonic vibration taking place there, so fused portions cannot be exposed to the outside.

Figure 22:
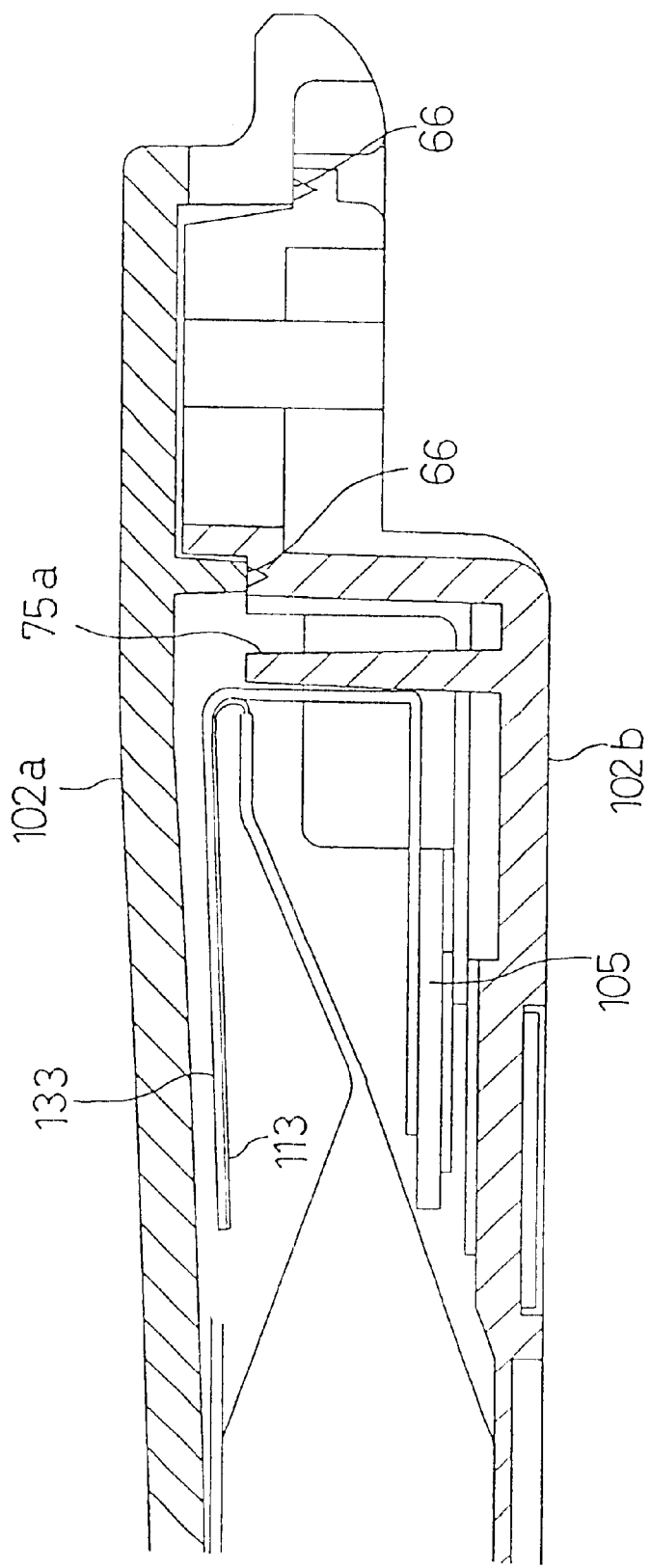
FIG. 22 is a cross-sectional view showing the construction for axial fitting of the bottom case and top case.

As described above, battery 3 is accommodated in pack case 102 with its flat plate faces in close contact with top case 102a and bottom case 102b. Both its side faces where sealed sides 11a are folded over onto the upper flat surface are accommodated on the side wall faces 73a, 73b formed on bottom case 102b, while its bottom surface is accommodated within pack case 102 on bottom wall face 74 in a contacting condition or separated by a slight gap. As shown in FIG. 22, lead connection side 11b is located in position on negative electrode connection lead 133 that is supported in position-locating fashion on upper wall face 75a. As shown in FIG. 17, lead connection side 11b of the sealed side 11a that is folded over onto positive electrode connecting lead 130 supported in position-locating fashion on upper wall face 75b is accommodated at the side of positive electrode lead 112, while lead connection side 11b of sealed side 11a on upper wall face 75a is accommodated at the side of negative electrode lead 113, within pack case 102, in a contacting condition or separated by a slight gap. Since the external casing 11 of battery 3 is formed by laminated sheets, there are larger errors in external dimensions than in the case of a metal case and the dimensions of the battery accommodating space 72 are set such that this contacts the wall faces in a condition with an error on the plus side of battery 3, so, in a condition where there is an error on the minus side, a slight gap is produced between the wall surfaces.

Thanks to such a construction of battery pack 101 in which battery 3 is accommodated within pack case 102, movement of battery 3 within pack case 102 on subjection to impact produced by dropping does not readily occur, so the occurrence of problems such as disconnection of leads or short-circuiting between the positive electrode plates and negative electrode plates incorporated in soft external casing 11 due to movement of battery 3 produced by the impact is prevented. That is, in a construction in which battery pack 101 is reduced in thickness and weight by a battery 3 using an external casing 11 formed of laminated sheet, countermeasures against impact can be achieved by the fact that the flat sheet faces at the top and bottom thereof have little liability to move, because of the frictional resistance produced by close contact at the planar parts of top case 102a and bottom case 102b, and further by the fact that the peripheral side faces have even less liability to move since they are abutted by or are surrounded with a slight gap by the respective wall faces. Also, the wall faces of bottom case 102b surrounding the side faces of battery 3 are made rigid since they are bonded nearly at their outsides by top case 102a, thereby preventing deformation of the wall faces due to impact from reaching battery 3.

Figure 23:
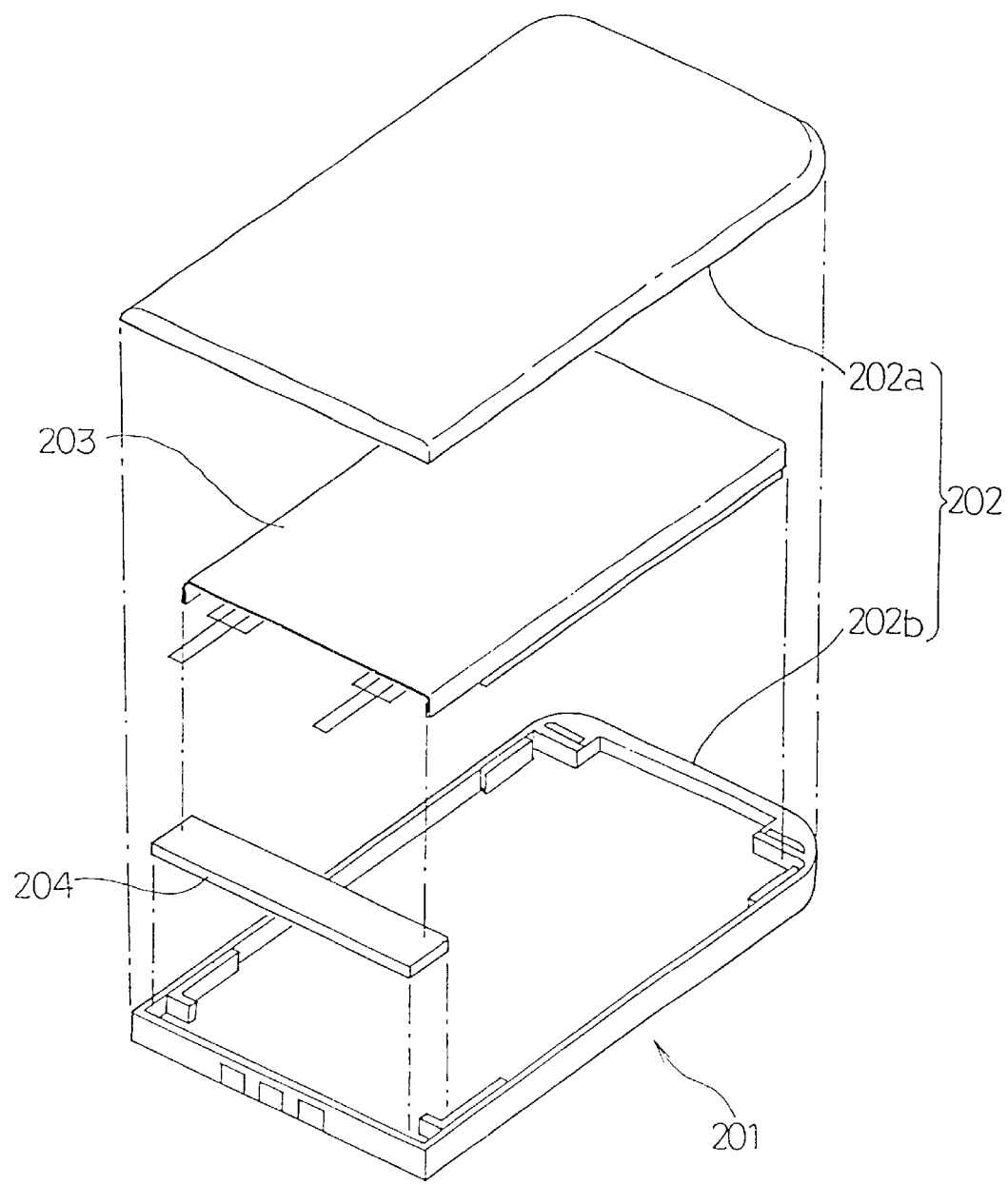
FIG. 23 is an exploded perspective view showing the construction of a battery pack according to a fourth embodiment.

Next, the construction of a fourth embodiment will be described. FIG. 23 shows an exploded view of the overall construction of a battery pack 201 according to a fourth embodiment; this provides a construction that prevents adverse effects when swelling is produced in the battery due to expansion of the electrode plates and/or generation of gas.

Figure 24:
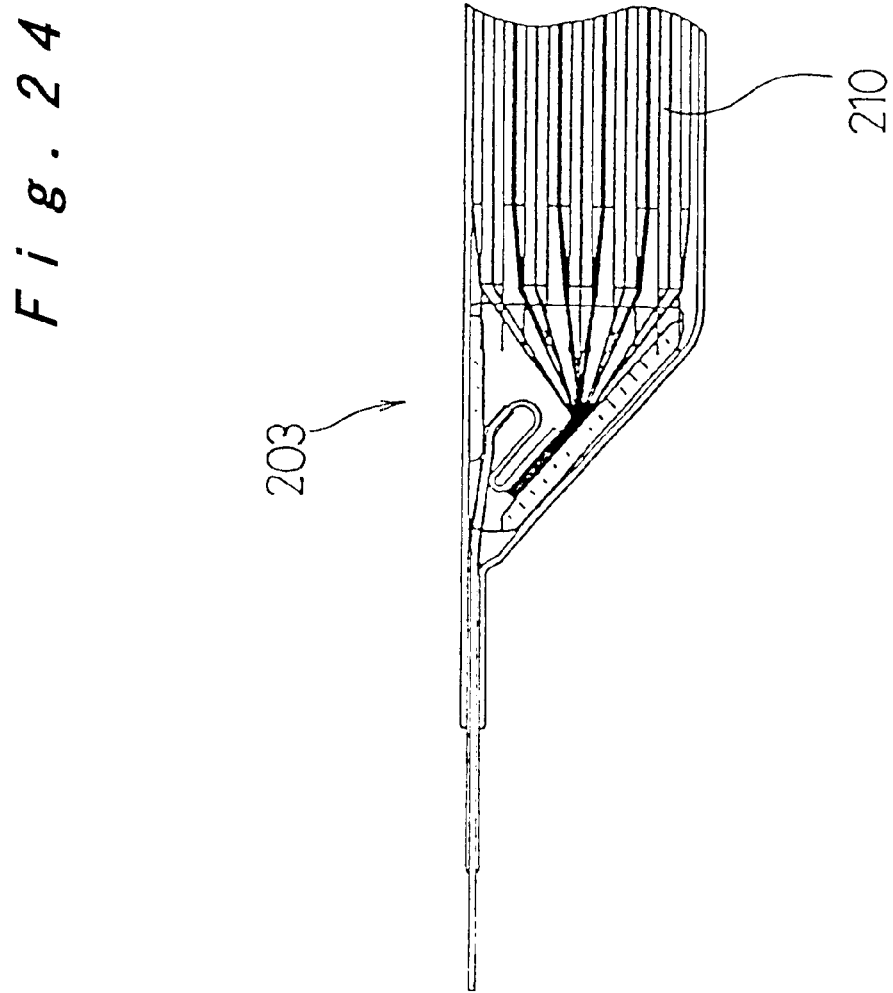
FIG. 24 is a cross-sectional view showing the construction of a battery.

As shown in cross-section in FIG. 24, the battery 203 that is employed in this embodiment is constituted by accommodating, in a flexible external casing 211 made of laminated sheet, electricity generating elements 210 obtained by laminating in a plurality of layers, with intervening separators made of polymer electrolyte sheet, positive electrode plates and negative electrode plates formed in sheet fashion. Electricity-generating elements 210 could be constituted by coiling positive and negative electrode plates and forming these by compression into a flat plate shape.

This external casing 211 is formed in a sealed construction using a laminated sheet wherein a plurality of resin layers are formed on both sides of an aluminum layer. As shown in FIG. 25, in laminated sheet 220 that forms external casing 211, on one side of a bisecting central folding line T, there is formed an electrode plate-accommodating recess 233 of rectangular shape somewhat larger than the external dimensions of electricity-generating elements 210 and having a depth practically the same as the thickness of electricity-generating elements 210. Electricity-generating elements 210 are accommodated in this electrode plate-accommodating recess 233, and the laminated sheet is folded in two at the central folding line T. Positive electrode lead to 212 is led out from the positive electrode plates of electricity-generating elements 210, while negative electrode lead 213 is led out from its negative electrode plates. Electrolyte is poured in and the aforesaid electrode plate accommodating recess 233 is sealed by sealing three locations P1, P2 and P3 at the peripheral sides by heat bonding, thereby forming battery 203 as shown in FIG. 26A. Reduction of the width dimension of battery 203 and improved sealing may be achieved by bending the sealed sides P2, P3 on both sides inwards as shown in FIG. 26B.

Figure 27:
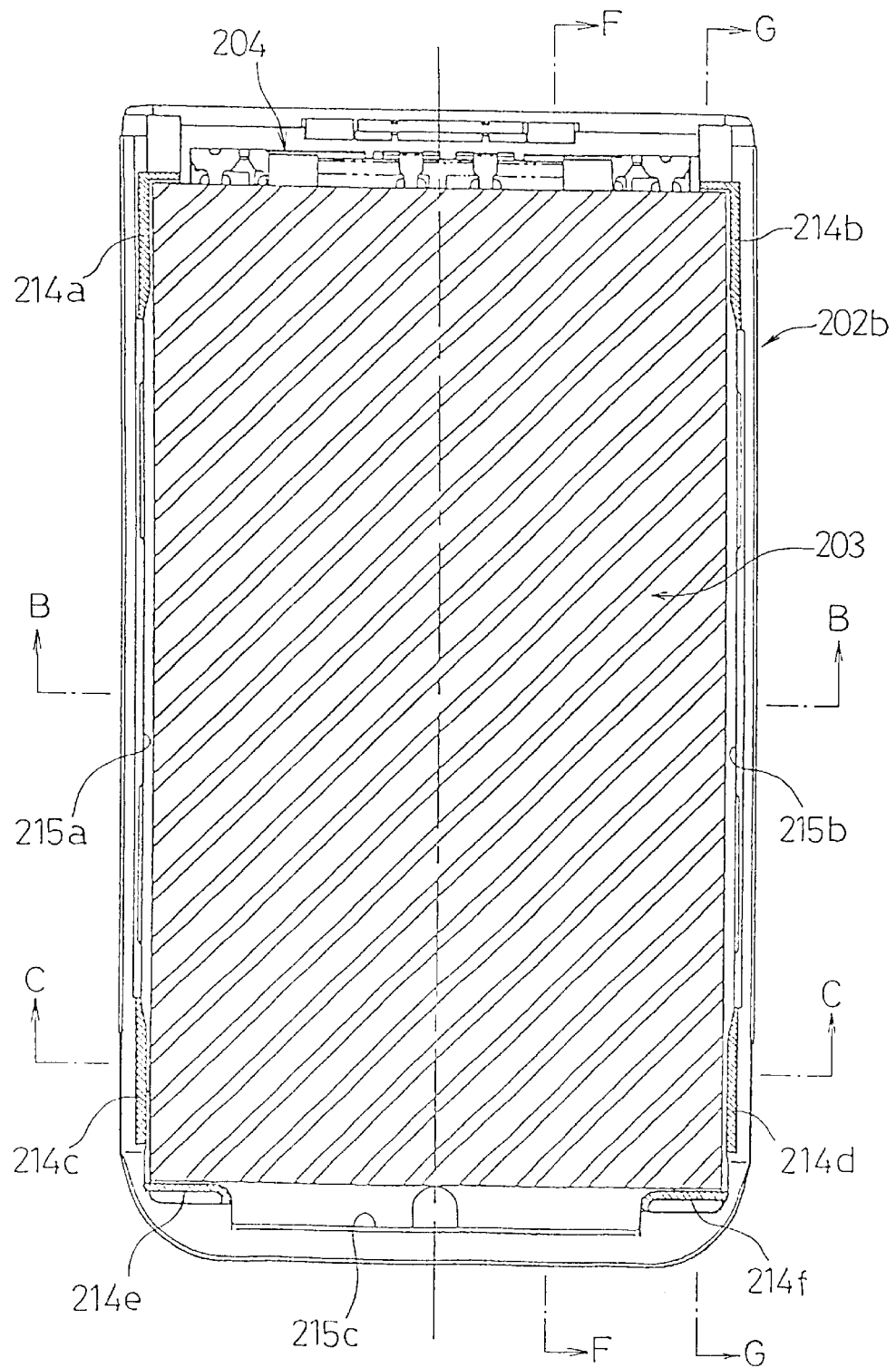
FIG. 27 is a plan view illustrating the condition in which a battery is accommodated in the bottom case.

As shown in FIG. 27, battery 203 constructed as above is accommodated together with a battery protection device 204 in bottom case 202b. At locations on bottom case 202b facing the side faces of battery 203 that is formed in a flat rectangular plate shape, there are formed position-restricting parts 214a, 214b, 214c, 214d, 214e and 214f (indicated by shading) for restricting the position of accommodation of battery 203, surrounding battery 203 at its four corners, respectively. Thus, the position of accommodation of battery 203 in bottom case 202b is positionally located, thereby restricting its movement from the position of accommodation. Also, in locations excluding the aforesaid positionrestricting parts 214a, 214b, 214c, and 214d at locations of bottom case 202b facing the left and right side faces shown in the drawing of battery 203, there are formed space-forming parts 215a, 215b forming a prescribed separation with the left and right side faces of battery 203, and, in locations excluding the aforesaid position-restricting parts 214e and 214f facing the bottom side face shown in the drawing, there is formed a space-forming part 215c forming a prescribed separation with the underside face of battery 203.

In the condition in which top case 202a is bonded with bottom case 202b accommodating battery 203 and battery protection device 204 illustrated in FIG. 27, the cross-section seen along the arrows of line C—C, which is the position of formation of the aforesaid position-restricting parts 214c and 214d, is shown in FIG. 28A, while the cross-section seen along the arrows of line B—B, which is the position of formation of the aforesaid position-restricting parts 215a and 215b, is shown in FIG. 28B. As shown in FIG. 28A, at the position where the position-restricting parts 214c and 214d are formed, the position of accommodation of battery 203 in the width direction is restricted by the proximity of the side faces of battery 203 (folded portions at sealed sides P2, P3). In contrast, as shown in FIG. 28B, at the position of space-forming parts 215a and 215b where the position-restricting parts 214a, 214b, 214c, and 214d are not formed, spaces are formed with respect to the side faces of battery 203.

Also, in the condition in which top case 202a is bonded to bottom case 202b accommodating battery 203 and battery protection device 204, the cross-section indicated by the arrows of line G—G which is the position of formation of the aforesaid position-restricting parts 214b, 214f is shown in FIG. 29A, while the cross-section indicated by the arrows of line F—F which is the position of formation of the aforesaid position-restricting part 215c is shown in FIG. 29B. As shown in FIG. 29 A, at the position where the position-restricting parts 214b and 214f are formed, the position of accommodation of battery 203 in the width direction is restricted by the proximity of the side faces of battery 203. In contrast, as shown in FIG. 29B, at the position of space-forming part 215c, a space is formed with respect to the side faces of battery 203.

Apart from the formation of position-restricting parts 214a~214f and space-forming parts 215a~215c with respect to the side faces of this battery 203, in respect of the planar faces of battery 203, there is formed an abutment part (position-restricting location 216) that applies tensioning force to battery 203 by abutting battery 203, and a gap part (space-forming location) 217 that forms a space with respect to battery 203. Specifically, as shown in FIG. 28, an abutment part 216 which is of increased thickness so as to abut the planar face of battery 203 is formed at the center of top case 202a, while gap part 217 is formed of the reduced thickness so as to provide a gap G between it and battery 203 on both sides thereof.

With a battery 203 of this construction, in a construction in which a group of laminated electrode plates 210 constituted by laminating a plurality of electrode plates is accommodated within a soft external casing 211, positional offset tends to occur between the laminated electrode plates when impact or vibration is applied, owing to the weak restraining force of laminated electrode plate group 210 of external casing 211. However, since the aforementioned position-restricting parts 214a, 214b surround the left and right corners on the lead exit side of a battery 203 and position-restricting parts 214c, 214d, 214e and 214f surround the left and right corners at the rear end of battery 203, movement of the electrode plates is restrained. Although the movement of the electrode plates risks causing problems such as internal short-circuiting or lead disconnection due to positional offset between the electrode plates, or damage to the laminated sheet of external casing 211 caused by movement of the electrode plates, resulting in the formation of local batteries due to contact of the electrode plates with the aluminum layer constituting the internal layer, thanks to the positional restraint provided by position-restricting parts 214c, 214d, 214e and 214f, these problems can be prevented. Also, since tensioning force in the direction of lamination of the electrode plates is supplied by the abutment part 216 that is formed on top case 202a, the frictional force between the laminated electrode plates is increased, making positional offset of the electrode plates even more unlikely to occur. The tensioning force produced by abutment part 216 also has the benefit of restricting expansion of laminated electrode plate group 210 caused by repeated charging/discharging or secular changes.

Generation of gas may occur if a secondary battery is left in an over-charged or fully charged condition. When a external casing 211 is constituted of a laminated sheet, as in the case of battery 203, since the external casing is of soft material, generation of gas immediately causes swelling of external casing 211, and this swelling of external casing 211 produces changes in the external shape of battery pack 201. In order to deal with the generation of gas produced by such misuse of the battery, the aforesaid space-forming parts 215a~215c and gap part 217 are provided, so as to allow the swelling of external casing 211 produced by the generation of gas to escape into the space within pack case 202. Since external casing 211 is of soft material, the swelling can escape into portions where there are spaces, other than the portions of battery 203 that are abutted by position-restraining parts 215a~215c or abutment part 216, thereby preventing deformation of battery pack 201, even if there should be some generation of gas.

Figure 30A:
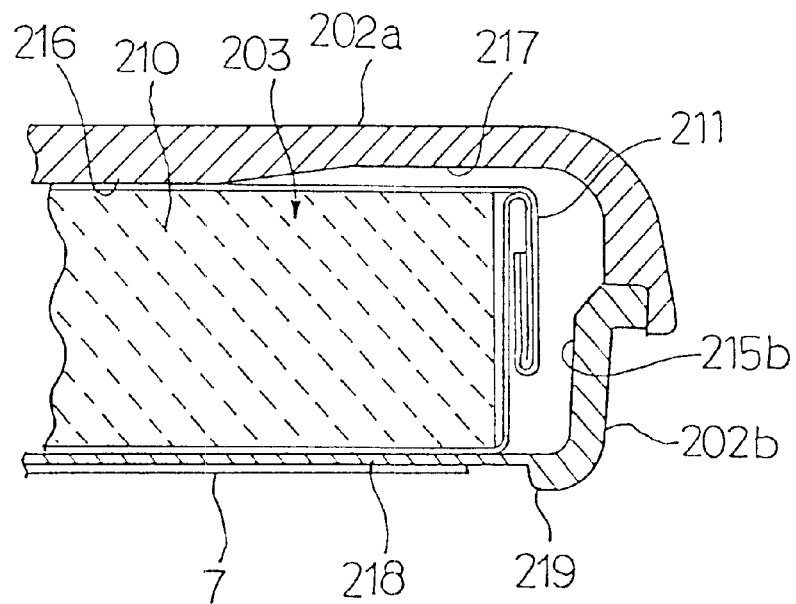
FIG. 30 is a cross-sectional view given in explanation of how the swelling of the external casing is accommodated by a space-forming part, FIG. 30A being a cross sectional view in the normal condition and FIG. 30B being a cross-sectional view in the condition in which gas has been generated.
Figure 30B:
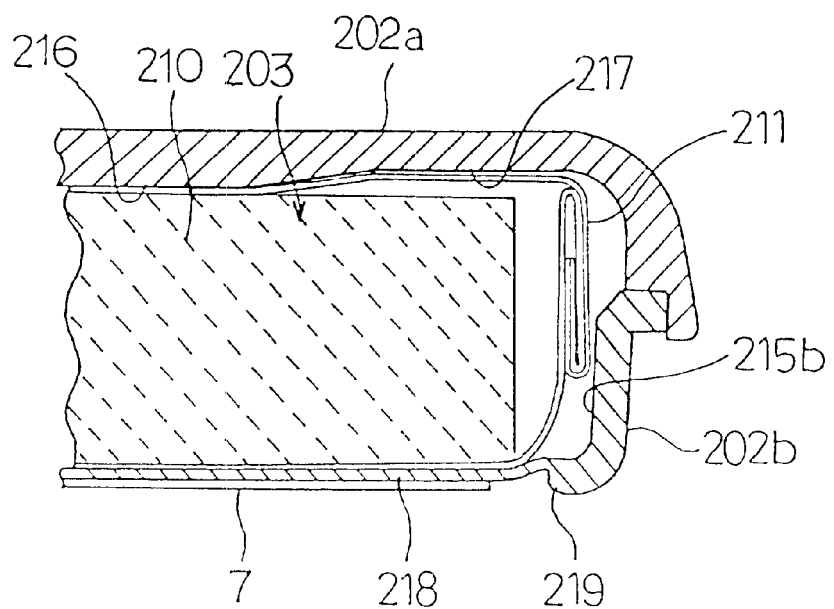

FIG. 30 shows a cross section of the position of formation of space-forming part 215b. As shown in FIG. 30A, in the normal condition, in which there is no generation of gas, spaces are formed between the side face of battery 203 and space-forming part 215b and between the flat plate face of battery 203 and gap part 217. If gas is generated within external casing 211 due to abnormal use of battery 203 as described above, as shown in FIG. 30B, external casing 211 made of soft material expands, but this expansion can be accommodated in the space formed by space forming part 215b and gap part 217. Since external casing 211 is of soft material, the expansion can escape into the portions where there are spaces i.e. other than those which are abutted by position-restraining parts 214a~214f or abutment part 216 on external casing 211, so that deformation of battery pack 201 can be prevented even if generation of gas should occur.

Just as in the case of the constructions of the embodiments described above, in battery pack 201 in this construction, the face of pack case 202 that is opposite the flat plate face of battery 203 is formed of small thickness, so that it forms a resiliently deformable face that performs resilient deformation when either the thickness of laminated electrode plate group 210 of battery 203 changes due to expansion, or expansion of external casing 211 occurs due to generation of gas as described above. Also, a peripheral part is formed that is formed in projecting fashion so as to surround this resiliently deformable face.

In the constructions of the embodiments described above, the form of battery 3 illustrated in the first embodiment or the form of battery 203 illustrated in the fourth embodiment may be suitably selected for use. Also, although the case was described in which, for the construction of batteries 3, 203, laminated electrode groups were employed obtained by laminating a plurality of positive and negative electrode plates, a construction could likewise be employed using coiled electrode plates compressed into a flat plate form after coiling of the positive and negative electrode plates.

Also, although examples of the construction of battery packs 1, 21, 101, 201 were described in which these were applied to battery power sources for portable telephones, the same construction could be applied also in the case of mobile computers or electronic notebooks or transceivers etc.

As described above, with the present invention, since the face of the pack case opposite the flat plate face of the battery is formed as a resiliently deformable face and a peripheral portion is formed that projects at the periphery thereof, expansion of the electrode plates is absorbed by expansion of the resiliently deformable face that is surrounded by the peripheral portion, so the maximum dimensions of the battery pack are unchanged and there is no effect on the equipment.

Also, since wall faces that surround the flat plate face and side faces of the battery are formed in the battery accommodating space of the pack case, damage to the battery caused by movement of the battery on subjection to vibration or impact can be prevented.

Furthermore, thanks to the formation of position restraining parts that abut the battery and space forming parts that provide a space between themselves and the battery within the pack case, damage caused by movement of the battery when subjected to vibration or impact is prevented by the battery being located in position and held in a prescribed position by the position restraining parts, and also deformation of the battery pack can be prevented from occurring, since expansion of the external casing when gas is generated in the battery can be relieved by the space-forming parts. The present invention is therefore advantageous in achieving reduction in size, weight, and thickness, and enhancement of safety, in a battery pack wherein a secondary battery is accommodated in an external casing of soft material.

What is claimed is:

1. A battery pack comprising:
   a secondary battery including electricity generating elements;
   an external casing, formed of flexible material, having a flat plate shape, said secondary battery being disposed within said external casing; and
   a pack case for encasing said secondary battery having a first side and a second side, said first side of said pack case being resiliently deformable and deforming resiliently corresponding to changes in a thickness of the secondary battery, and the second side of the pack case being rigid.

2. The battery pack according to claim 1, wherein the secondary battery includes a plurality of electrode plates, said electrode plates being formed by laminating a plurality of positive and negative electrode plates in the form of sheets within the external casing.

3. A battery pack comprising:
   a secondary battery including electricity generating elements and having side faces,
   an external casing of flexible material formed in a flat place shape encasing said secondary battery;
   a pack case having a first side and a second side encasing said secondary battery; and
   a rigid element supporting said first side and said second side of said pack case and surrounding said side faces of said secondary battery, wherein the first side and the second side of said pack case are resiliently deformable faces that deform resiliently corresponding to changes of thickness of the secondary battery.

4. A batter pack comprising:
   a secondary battery including electricity generating elements;
   an external case formed of soft material and formed in a flat plate shape for encasing said secondary battery; and
   a pack case having a first side and a second side for encasing said secondary battery;
   a thickness of the pack case without the secondary battery encased therein being smaller than a thickness of the secondary battery; and
   at least one of the said first side and said second side of said pack case being resiliently deformable and deforming resiliently corresponding to changes of thickness of the secondary battery.

5. A battery pack comprising:
   a secondary battery including electricity generating elements;
   an external casing formed of soft material and formed of a flat plate shape encasing said secondary battery;
   a pack case encasing said secondary battery and having a periphery, a first side and a second side; and
   a peripheral part projecting to a prescribed height from one of the periphery, the first side and the second side of the pack case;
   wherein at least one side of said pack case is resiliently deformable and deforms resiliently corresponding to changes in thickness of the secondary battery.

6. A battery pack comprising;
   a secondary battery having electricity generating elements;
   a battery protection device having a circuit board with at least a protective circuit to protect said secondary battery;
   a pack case having flat sides and accommodating said secondary battery and the battery protection device;
   a positive electrode lead and a negative electrode lead leading from said secondary battery;
   external input/output terminals being provided on the pack case, said positive electrode lead and negative lead being connected by said battery protecting device to said external input/output terminals;
   a pair of laminated sheets; and
   an external casing;
   wherein said secondary battery is within the external casing which is sealed by welding a periphery of the pair of laminated sheets thus forming a weld-sealed side, the positive electrode lead and the negative electrode lead are led from the weld-sealed side, and said battery protection device is arranged on the side of the secondary battery where said positive electrode lead and said negative lead are led out.

7. The battery pack according to claim 6, wherein the secondary battery has a flat plate face, the circuit board has a planar surface which is arranged parallel to the flat plate face of secondary battery, and the circuit board is overlapped with at least part of the weld-sealed portion of the external casing.

8. The battery pack according to claim 6, further comprising:
   a positive electrode connection member;
   a negative electrode connection member;
   the circuit board being connected to the positive electrode connection member;
   the circuit board being connected to the negative electrode connection member;
   the battery protection device being offset to one side in a thickness direction of the pack case toward one of said flat sides;
   the positive electrode lead being connected with the positive electrode connection member; and
   the negative electrode lead being connected with the negative electrode connection member.

9. The battery pack of claim 6, further comprising an insulating member wherein the insulating member is arranged between at least the weld-sealed side of the external casing and the battery protection device.

10. The battery pack of claim 6, further comprising a PTC element formed in a plate shape having a planar face parallel with the flat plate direction of the secondary battery and arranged in a position overlapped with at least part of the weld-sealed side of the external casing.

11. A battery pack comprising:
   a secondary battery, including electricity generating elements, having flat plate faces and side faces;
   an external casing, formed of flexible material and formed in a flat plate shape with flat plate faces and side faces, for encasing said secondary battery; and
   a pack case for encasing said secondary battery, said pack case including a resiliently deformable portion, a planar portion facing the flat plate faces of said secondary battery and a plurality of wall face parts facing the sides faces of the secondary battery wherein said planar portion and said wall face parts restrict a position of secondary battery in the pack case.

12. A battery pack comprising;
   a secondary battery including electricity generating elements;
   a flexible external casing for encasing said battery pack; and
   a pack case formed in a flat plate shape having a top case and a bottom case, said top case and said bottom case form a battery accommodating space of internal dimension corresponding to a thickness of the secondary battery, and having bonding parts respectively formed on the top case and the bottom case,
   wherein said battery accommodating space is formed when the top case and the bottom case are mated by bringing into abutment bonding parts respectively formed on the top case and the bottom case, the battery pack is integrated by bonding the top case and the bottom case by said bonding parts, the bonding parts are formed to affect manual fitting in between the top case and the bottom case such as to maintain a position by abutment between said bonding parts when the top case and the bottom case are mated.

13. The battery pack according to claim 12, wherein said flexible external casing includes wall faces and said secondary battery includes side faces, said wall faces are formed surrounding the side faces of the secondary battery at a periphery of the battery accommodating space and bonding parts are formed outside of the wall faces.

14. A battery pack comprising;
   a secondary battery including electricity generating elements;
   an external casing formed of flexible material and formed in a flat plate shape for encasing said secondary battery; and
   a pack case having a position restricting location and a space-forming location for encasing said secondary battery, wherein said position restricting location restricts position of said secondary battery and said space-forming location provides a space between said pack case and said secondary battery.

15. The battery pack according to claim 14, wherein said electricity generating elements are a group of laminated electrode plates which are a plurality of laminated positive and negative electrode plates.

16. The battery pack according to claim 14, wherein said pack case has an inside face and said secondary battery has a flat plate face, said position restricting location and said space-forming location are on the inside face of said pack case and face the flat plate face of said secondary battery.

17. The battery pack according to claim 14, wherein said secondary battery has four corners and side faces, said position restricting location is formed to surround at least said four corners of said secondary battery on the inside of the pack case facing the side faces of said secondary battery.

* * * * *